United States Patent [19]
Anderson et al.

[11] Patent Number: 6,096,469
[45] Date of Patent: Aug. 1, 2000

[54] INK RECEPTOR MEDIA SUITABLE FOR INKJET PRINTING

[75] Inventors: Mark T. Anderson, Woodbury; Mark F. Schulz, Lake Elmo; Tadesse G. Nigatu, Maplewood, all of Minn.

[73] Assignee: 3M Innovative Properties Company, St. Paul, Minn.

[21] Appl. No.: 09/314,794

[22] Filed: May 18, 1999

[51] Int. Cl.$^7$ ............................... G03G 9/08; B32B 9/04; C01B 33/12

[52] U.S. Cl. ..................... 430/119; 428/318.4; 428/446; 423/335; 423/702; 423/710

[58] Field of Search .................... 430/119; 428/318.4, 428/446; 423/335, 702, 710

[56] References Cited

U.S. PATENT DOCUMENTS

| | | | |
|---|---|---|---|
| 4,954,395 | 9/1990 | Hasegawa et al. | 428/318.4 |
| 5,057,296 | 10/1991 | Beck | 423/277 |
| 5,084,340 | 1/1992 | Light | 428/327 |
| 5,098,684 | 3/1992 | Kresge et al. | 423/277 |
| 5,102,643 | 4/1992 | Kresge et al. | 423/328 |
| 5,104,515 | 4/1992 | Chu et al. | 208/46 |
| 5,108,725 | 4/1992 | Beck et al. | 423/263 |
| 5,110,572 | 5/1992 | Calabro et al. | 423/328 |
| 5,112,589 | 5/1992 | Johnson et al. | 423/328 |
| 5,145,816 | 9/1992 | Beck et al. | 502/60 |
| 5,156,829 | 10/1992 | McCullen et al. | 423/718 |
| 5,198,203 | 3/1993 | Kresge et al. | 423/718 |
| 5,211,934 | 5/1993 | Kresge et al. | 423/706 |
| 5,215,737 | 6/1993 | Chu et al. | 423/706 |
| 5,246,689 | 9/1993 | Beck et al. | 423/705 |
| 5,250,282 | 10/1993 | Kresge et al. | 423/705 |
| 5,264,203 | 11/1993 | Beck et al. | 423/703 |
| 5,300,277 | 4/1994 | Kresge et al. | 423/703 |
| 5,304,363 | 4/1994 | Beck et al. | 423/328.1 |
| 5,308,602 | 5/1994 | Calabro et al. | 423/705 |
| 5,334,368 | 8/1994 | Beck et al. | 423/704 |
| 5,507,296 | 4/1996 | Bales et al. | 128/751 |
| 5,800,800 | 9/1998 | Pinnavaia et al. | 423/702 |
| 5,922,299 | 7/1999 | Bruinsma et al. | 423/335 |

FOREIGN PATENT DOCUMENTS

| | | |
|---|---|---|
| WO 95/28288 | 10/1995 | WIPO . |
| WO 97/07056 | 2/1997 | WIPO . |
| WO 99/03685 | 1/1999 | WIPO . |
| WO 99/03929 | 1/1999 | WIPO . |

OTHER PUBLICATIONS

J.S. Beck et al., "A New Family of Mesoporous Molecular Sieves Prepared with Liquid Crystal Templates", J. Am. Chem. Soc. 1992, 114, 10834–10843.

U. Ciesla et al., "Critical Appraisal of the Pore Structure of MCM–41", pp. 231–240, Plenum Press, New York, 1995.

Q. Huo et al., Generalized synthesis of periodic surfactant/inorganic composite materials, Nature, vol. 368, pp. 317–321, Mar. 24, 1994.

C.T. Kresge et al., Ordered mesoporous molecular sieves synthesized by a liquid–crystal template mechanism, Nature, vol. 359, pp. 710–712, Oct. 22, 1992.

M. Templin et al., "Organically Modified Aluminosilicate Mesostructures from Block Copolymer Phases", Science, vol. 278, pp. 1795–1798, Dec. 5, 1997.

M. Grün et al., "The Synthesis of Micrometer– and Submicrometer–Size Spheres of Ordered Mesoporous Oxide MCM–41", Adv. Mater. 1997, 9, No. 3, pp. 254–257.

D. Zhao et al., "Triblock Copolymer Syntheses of Mesoporous Silica with Periodic 50 to 300 Angstrom Pores", Science, vol. 279, pp. 548–552, Jan. 23, 1998.

*Primary Examiner*—Mark Chapman
*Attorney, Agent, or Firm*—Scott A. Bardell

[57] ABSTRACT

The ink receptor media of the invention comprise an ink receptor comprising surfactant templated mesoporous particles dispersed within an organic binder on the substrate. The ink receptor media may also have an ink fixing material within or on the ink receptor. The invention also describes surfactant templated silica particles having a narrow particle size distribution and having intraparticle pore sizes of about 1.5 to about 10 nm and methods of preparing said particles. The invention also describes a colloidal dispersion of STM particles methods of making said dispersions.

39 Claims, 9 Drawing Sheets

INK RECEPTOR MEDIA SUITABLE FOR INKJET PRINTING

FIELD OF THE INVENTION

This invention relates to ink receptor media and more particularly to ink receptor media comprising a substrate coated thereon with particles in a binder. This invention also relates to surfactant templated silica particles.

BACKGROUND OF THE INVENTION

The inkjet printing process is now well known. Recently, wide format printers have become commercially available, making feasible the printing of large format articles such as posters, signs, and banners. Inkjet printers are relatively inexpensive as compared with many other hardcopy output devices, such as electrostatic printers. Generally, inkjet inks are wholly or partially water-borne. Inkjet images may be printed on plain paper or on a suitable ink receptor medium that has been treated or coated to improve its ink receptor properties. For example, it is known to apply an additional layer of material to an ink receptor medium to improve the receptivity to and adhesion of inkjet inks. Such known materials are overhead transparencies and glossy papers, but they can have certain disadvantages such as color bleed, low ink capacity (i.e., flooding), a slow ink absorption rate (long dry times), and low color density.

Porous solids created by nature or by synthetic design have found great utility in the areas of catalysis and separation. Generally, such porous materials are classified by pore size: microporous having pore sizes of <2 nm; macroporous having pore sizes exceeding 50 nm; and mesoporous having pore sizes between 2 and 50 nm. Such porous materials can be structurally amorphous, paracrystalline, or crystalline. Amorphous materials (for example, silica gel) and paracrystalline materials exhibit wide pore size distributions in the mesoporous range. Zeolites and molecular sieves have highly crystalline structures and uniform pore size, but have pore sizes in the microporous range. Mesoporous molecular sieves are known having a narrow pore size distribution, but they are generally said to be formed of aggregated particles and having a broad particle size distribution and a morphology ranging from spherical to hexagonal prisms.

SUMMARY OF THE INVENTION

In one aspect, the invention provides ink receptor media comprising a substrate, an ink receptor on the substrate comprising surfactant templated mesoporous particles, and an organic binder. The ink receptor media of the invention may also have an ink fixing agent in contact with at least a portion of the ink receptor.

As used herein, "surfactant templated mesoporous particles" (STM) means inorganic materials having substantial intraparticle porosity that are formed with an organic templating agent and have pore sizes of about 1.5 to 50 nm. Examples of such particles include surfactant templated silica particles (STS), surfactant templated silica-metal oxide particles, non-silica surfactant templated metal oxides, and the like.

As used herein, an "ink receptor" comprises a combination of STM particles in an organic binder in a substantially solvent free form to immediately accept ink.

In another aspect, the invention provides an ink receptor composition comprising a mixture of STM particles and an organic binder.

In another aspect, the invention provides a method of making an ink receptor medium comprising the step of coating an ink receptor composition comprising STM particles and an organic binder onto a substrate. Further steps may include removing solvent from the composition to form an ink receptor and optionally applying an ink fixing agent on the ink receptor.

In another aspect, the invention provides a method of printing an image on a substrate comprising the steps of providing a substrate coated with an ink receptor, the ink receptor comprising STM particles and an organic binder, and printing an image onto the ink receptor medium.

Some features of ink receptor media of the invention are that they have a large capacity to absorb ink, provide rapid ink drying times, provide sharp delineation of deposited drop edges in inkjet printed colors, provide good color density, provide waterfastness to the applied ink, are UV and chemically stable, are abrasion resistant, are mechanically flexible, and provide excellent adherence to a substrate. In some embodiments of the invention, optically clear ink receptor coatings may be achieved. In another aspect, the invention provides a composition of matter comprising STS particles having a mean particle size of from about 0.01 $\mu$m to about 100 $\mu$m, wherein 90 percent of the particles have a particle size of less than 4 $\mu$m, preferably less than 3 $\mu$m, more preferably less than about 2 $\mu$m, and a pore size of from about 1.5 nm to about 30 nm, preferably from about 2 nm to about 10 nm. The STS particles of the invention are preferably spherical or ellipsoidal in shape. The STS particles of the invention are formed using an acid catalyst and may also have a high concentration of surface silanols in an uncalcined state. Such a surface is believed to provide further ink fixing properties.

As used herein, "STS particles" means materials comprising silica having substantial intraparticle porosity that are formed with an organic templating agent. Specific examples of organic templating agents used herein are surfactants and block copolymers.

As used herein, "SEM" means scanning electron microscopy; "TEM" means transmission electron microscopy; and XRD means X-ray diffraction analysis.

The mean particle sizes of the STS particles described herein are measured by using SEM.

As used herein, "particle size" means the largest cross-sectional particle dimension.

As used herein, "pore size" is determined experimentally by a combination of XRD and TEM. Using this method, X-ray diffraction measurements are used to determine the maximal d-spacing for the samples. From the d-spacing data and TEM micrographs, pore size is determined by converting the d-spacing to a lattice constant using information about the symmetry of the array of pores, and subtracting from this value the dimension of the pore wall thickness measured from the TEM micrographs. The d-spacing of the primary Bragg peak (for example, 100 for a hexagonal array) sets a maximum pore size of the periodic array.

In another aspect, the invention provides STS particles that are transparent. The transparent silica particles can be characterized as having a mean particle size of 100 nm (0.1 $\mu$m) or less, preferably about 10 to about 50 nm (about 0.02 to about 0.05 $\mu$m), and pore sizes of about 1.5 to about 5 nm, preferably from 2 to 4 nm. The transparent particles of the invention are prepared in a solvent, are preferably unagglomerated (not agglomerated), and can be re-suspended in solvent after the solvent has been decanted. These particles may be either acid or base catalyzed.

In another aspect, the invention provides a colloidal dispersion of STM particles comprising unagglomerated surfactant templated particles in a solvent. The particles have a mean particle size of about 500 nm or less, preferably about 150 nm or less, more preferably about 100 nm or less and pore sizes of about 1.5 to about 30 nm, preferably about 2 to about 10 nm. STS particles are preferred. Preferably, the colloidal dispersion is transparent, and more preferably, transparent and stable. The preferred mixture containing transparent particles can be characterized as having a pH of about 1 to about 2, as stabilized using an organic acid, and as containing up to about 30 weight percent transparent particles, preferably less than 12 weight percent, more preferably less than 6 weight percent. As used herein, "stable" means that the colloidal suspension remains dispersible for at least 1 month at room temperature. The stable colloidal dispersions of the invention are stable for up to 3 months or longer, depending upon the particle concentration.

In another aspect, the invention provides a method of making STS particles comprising the steps of forming a mixture comprising water, a silica source, an organic templating agent, and a catalyst; and aging the solution for a sufficient time to form said silica particles.

In yet another aspect, the invention provides a method of making surfactant templated silica comprising the steps of forming a mixture comprising water, a silica source, an organic templating agent comprising an ethoxylated fatty amine, and an acid catalyst and aging the solution for a sufficient time to form said silica particles.

Further steps for methods of making STS include filtering of the mixture, drying the mixture, grinding the mixture, calcining the mixture at a temperature sufficient to decompose the templating agent or extracting the templating agent from the particles, and milling or shearing the particles in slurry form to reduce particle size.

Generally, STS particles differ from other forms of silica, for example, colloidal silica, precipitated silica, and conventional zeolites. For instance, STS particles typically have approximately 50 volume percent intraparticle porosity, whereas colloidal silica or precipitated silica does not have appreciable intraparticle porosity. Precipitated silica (formed by aggregating approximately 4–10 nm colloidal silica), does have interparticle porosity, but the pore size distribution is quite broad compared to that of STS particles. In addition, precipitated silica generally forms large friable masses that yield micron-size or larger irregular pieces when ground or shear mixed.

In contrast, STS particles typically have a more uniform morphology. STS particles differ from conventional molecular sieves in that STS particles have pores that are ~1.5 to ~30 nm in size, whereas conventional molecular sieves have pores that are ~0.3 to ~1.2 nm in size.

BRIEF DESCRIPTION OF THE DRAWINGS

FIG. 2 is a scanning electron micrograph of STS nanoparticles prepared according to Example 25a.

FIG. 5 is a scanning electron micrograph of STS particles prepared according to Example 40a.

DETAILED DESCRIPTION OF THE INVENTION

Figure 1:
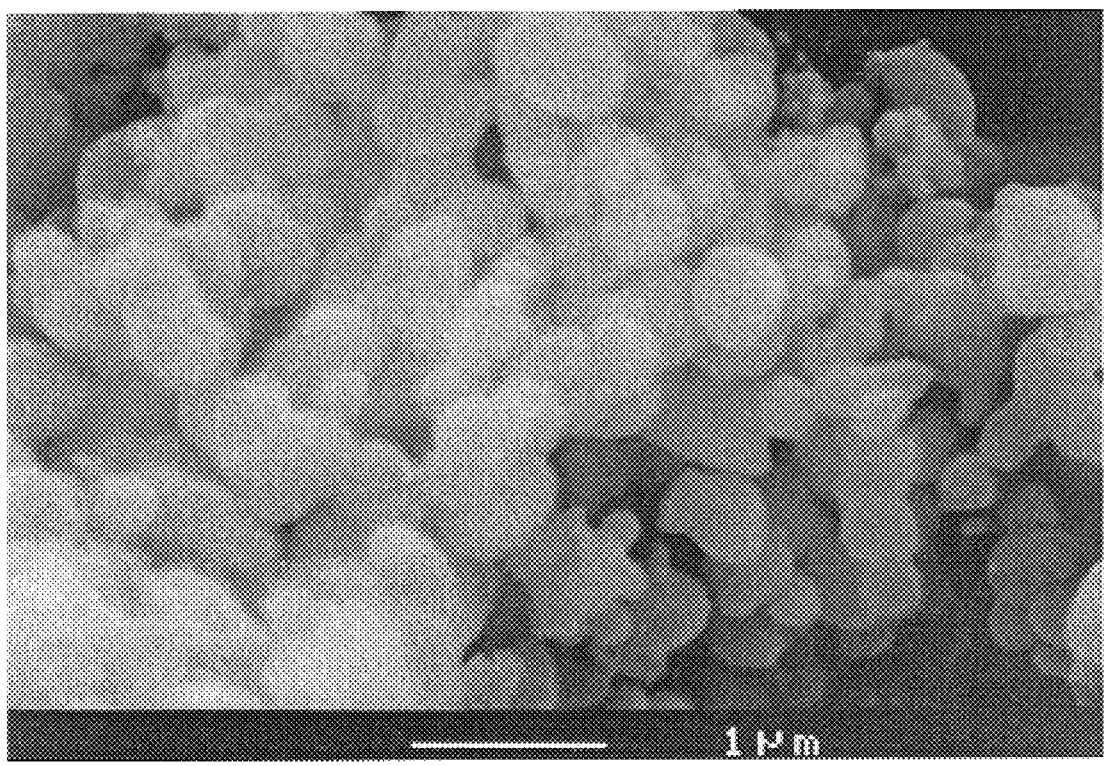
FIG. 1 is a scanning electron micrograph of STS particles prepared according to Example 1.
Figure 2:
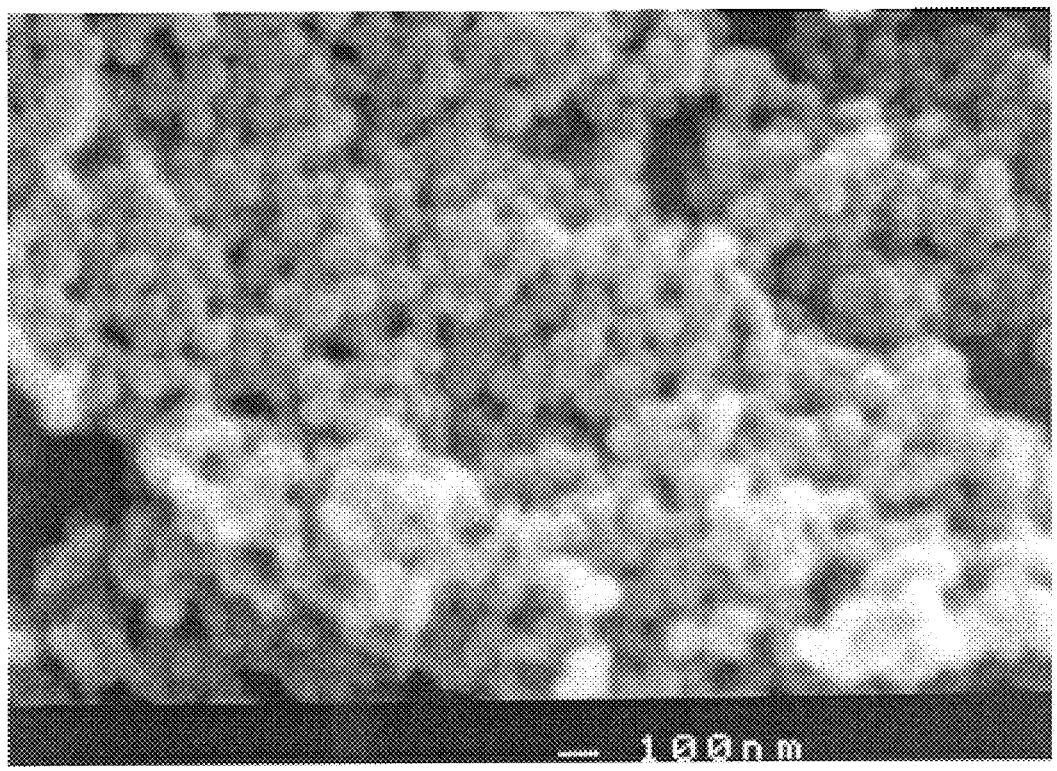
Figure 3:
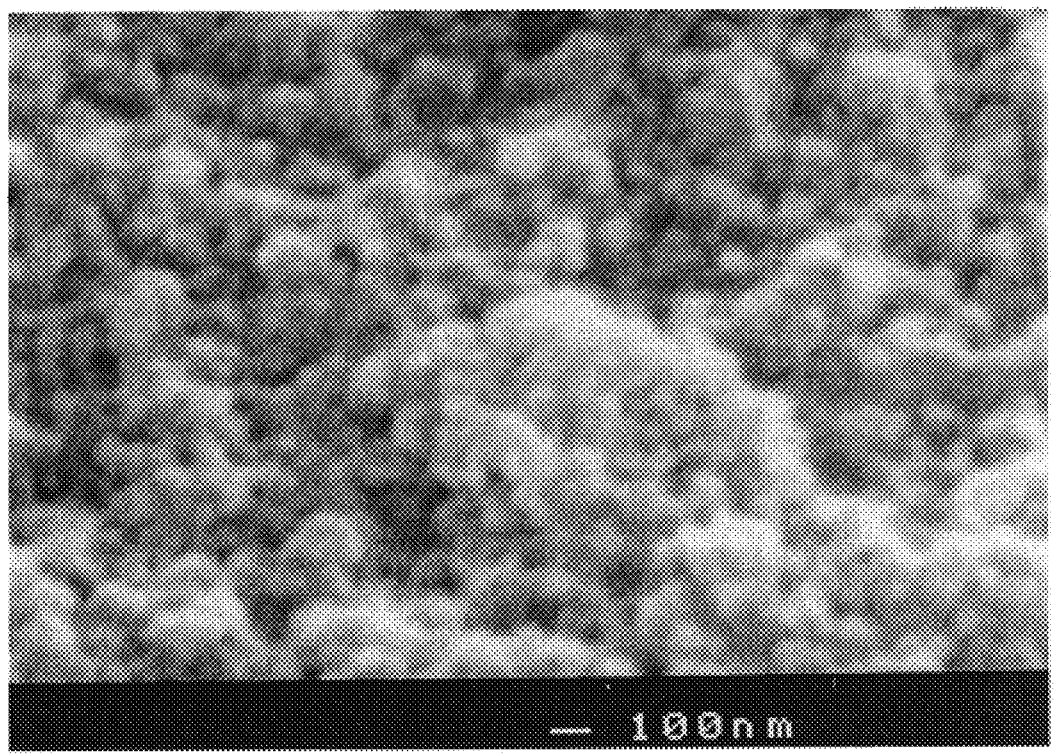
FIG. 3 is a scanning electron micrograph of STS nanoparticles prepared according to Example 25b.
Figure 4:
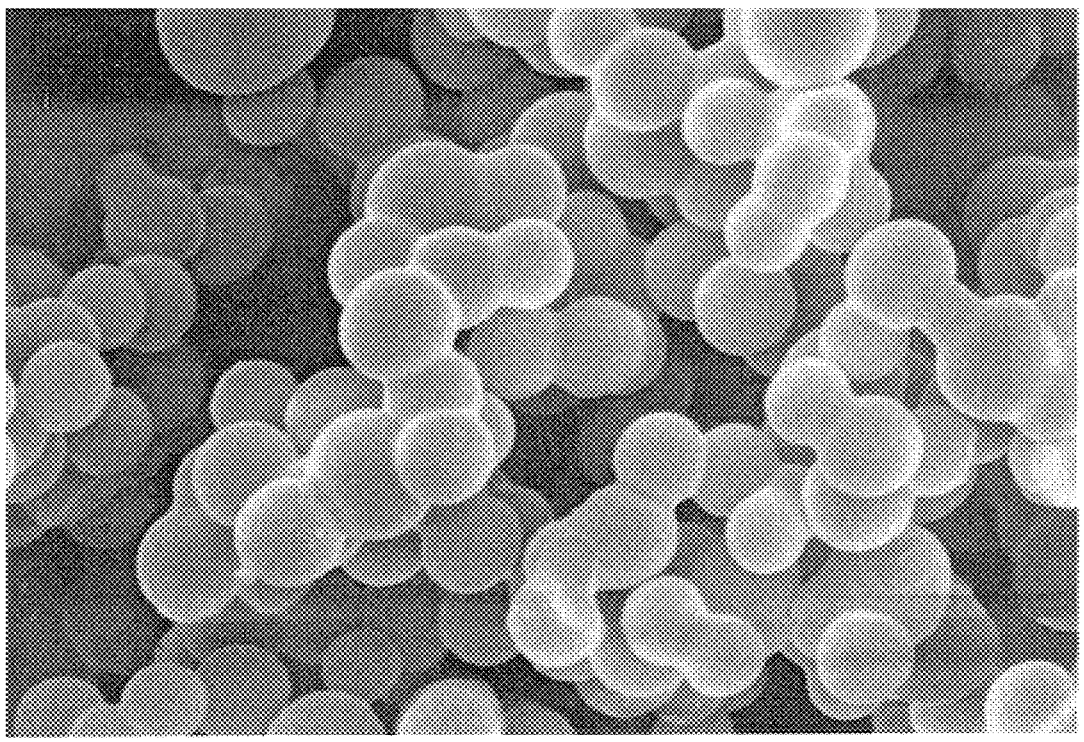
FIG. 4 is a scanning electron micrograph of STS particles prepared according to Example 38.
Figure 5:
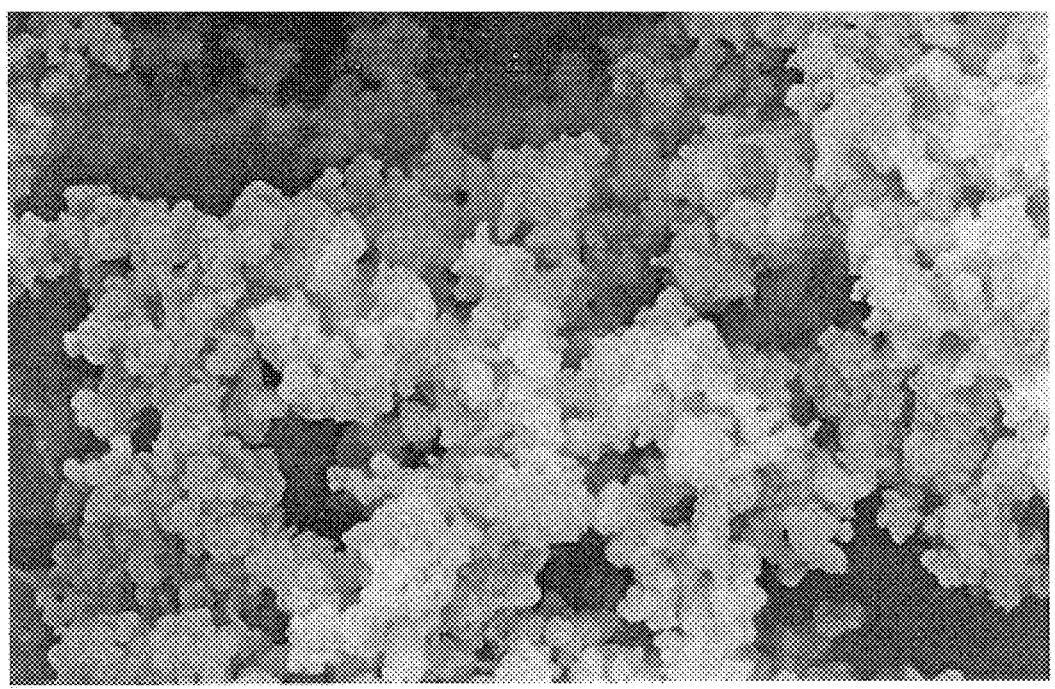
Figure 6:
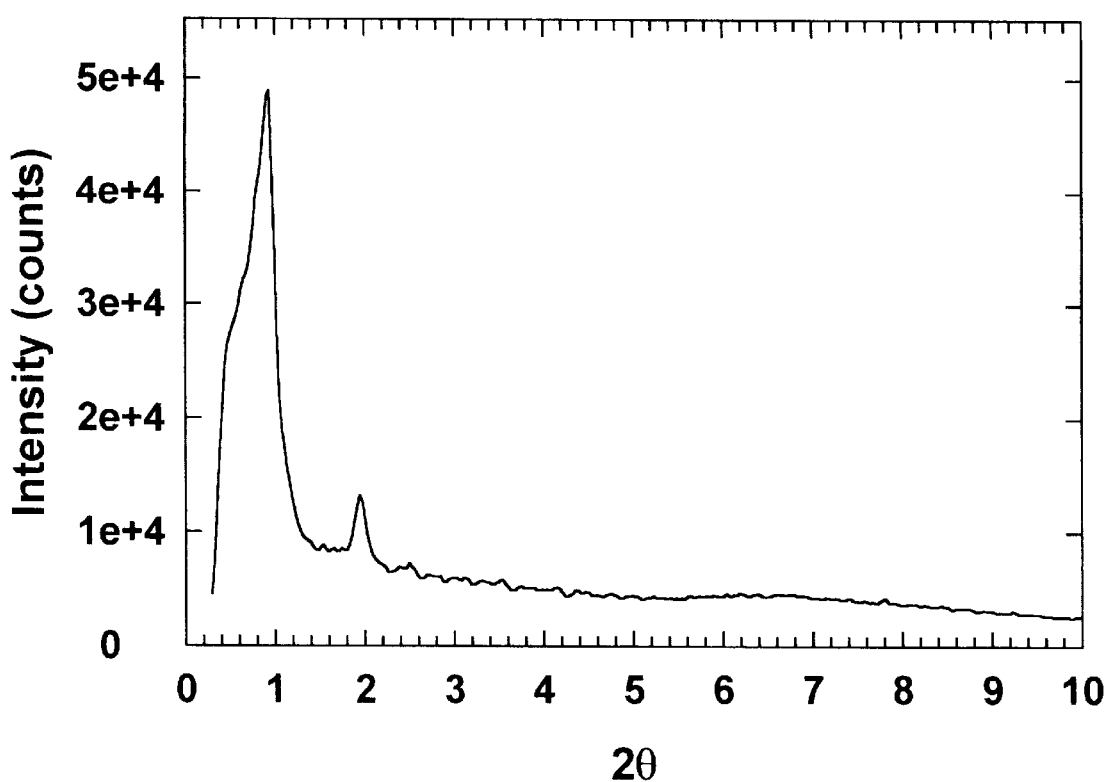
FIG. 6 is an X-ray diffraction spectrum of STS particles prepared as in Example 44. The 100, 200, and 300 peaks are evident and the cell hexagonal constant (pore to pore distance) is approximately 11.5 nm.
Figure 7:
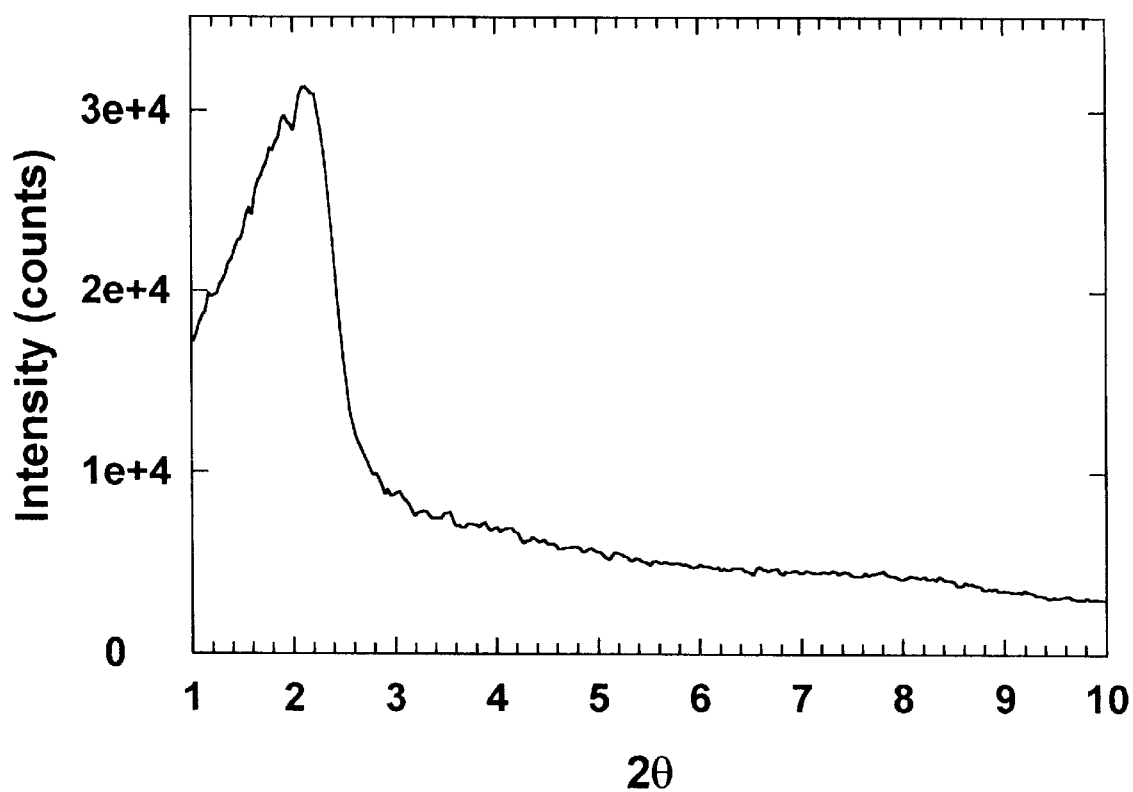
FIG. 7 is an X-ray diffraction spectrum of STS particles prepared as in Example 39 except the final molar weight ratios were 1.0 TEOS to 0.13 $C_{16}$TAB to 74 water to 18 methanol to 5.3 HCl. The peak position is approximately d=42.5 nm.
Figure 8:
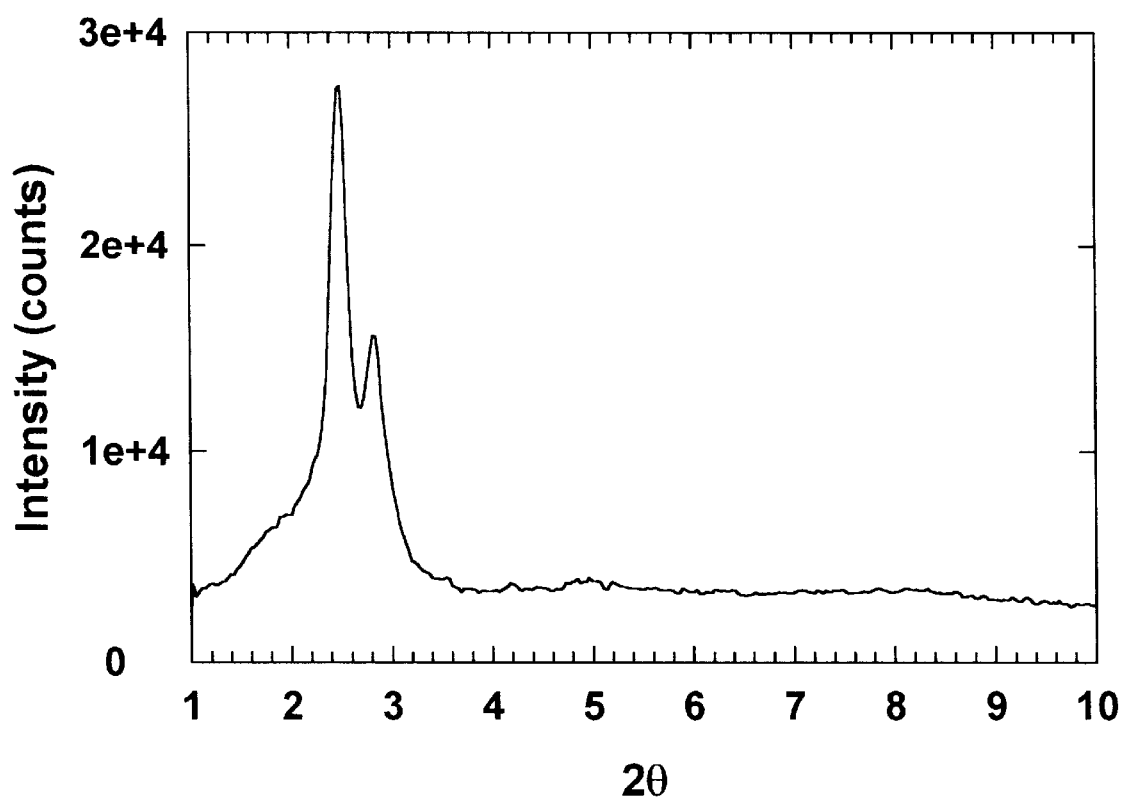
FIG. 8 is an X-ray diffraction spectrum of STS nanoparticles prepared as in Example 31 using acetic acid. The peaks at 3.57, 3.13, and 1.79 nm indicate a cubic structure (three-dimensional porosity).
Figure 9:
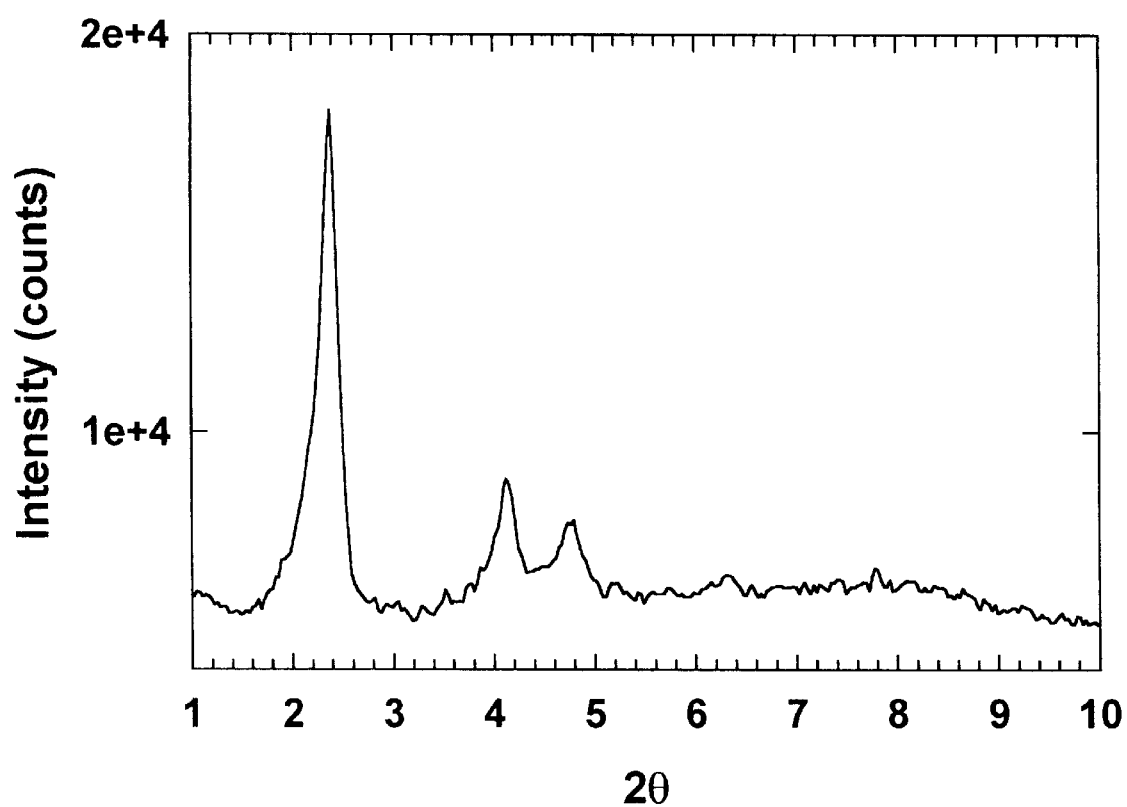
FIG. 9 is an X-ray diffraction spectrum of STS particles prepared as in Example 9. Diffraction peaks were present at d=3.72, 2.15, and 1.85 which indicates a hexagonal structure with $P_6$ symmetry.

Ink receptor media of the invention comprise a substrate, an ink receptor on the substrate comprising surfactant templated mesoporous particles, and an organic binder. Optionally, depending on the specific inks used and intended application, an ink fixing agent may be further incorporated into and/or applied to the ink receptor.

While STM particles are broadly suitable for use in the invention, in some cases it may be desirable to use mesoporous particles of such small size that they may be used to prepare transparent ink receptor coatings (i.e., transparent STM or STS particles). In other cases, it may be desirable or preferable to use surfactant templated silica particles (i.e., STS particles). STS particles are a subset of the larger group of STM particles that are useful in the invention.

Though the ink receptor media of the invention are suitable for inkjet printing, they are also suitable for receiving ink by other printing processes, such as by fountain pen, flexography, screen printing, and the like.

STM Particles

The receptor compositions of the invention contain STM particles. Any STM particles (or combination of STM particles) having a primary unaggregated mean particle size of less than about 100 $\mu$m may be used in the receptor media of the invention. The STM particles impart additional ink capacity, scratch resistance, dimensional stability, and ink fixing properties to an ink receptor medium.

Some preferred STM particles for use in the receptors of the invention are STS particles that are characterized as having an intraparticle pore size of typically greater than 1.5 nm and an intraparticle mean pore size distribution ranging from about 1.5 to about 30 nm, preferably about 2 to about 10 nm, more preferably from about 2 to about 5 nm. Preferred STS particles for use in ink receptors are spherical or ellipsoidal in shape and have a mean particle size range of about less than 0.01 $\mu$m to about 100 $\mu$m, wherein 90 percent of the particles have a particle size less than 4 $\mu$m, preferably less than 3 $\mu$m, more preferably less than 2 $\mu$m.

Preferred STS particles can also be characterized as having at least one low angle Bragg peak in its X-ray diffraction pattern. The low angle peak generally occurs in the region between 0.5 and 4.5 degrees two-theta with copper $K_\alpha$ radiation. This corresponds to a d-spacing of approximately 2 to 30 nm. In some cases, 3 or more additional diffraction peaks are observed in the X-ray diffraction pattern in addition to the primary peak.

The surfaces of useful STS particles (before or after acid exchange of the surfactant) typically have a $Q^3/Q^4$ signal ratio of greater than 0.5 as measured by $^{29}$Si NMR with magic angle spinning. The signal for $Q^4$ occurs at about −106 to about −108 ppm relative to a tetramethylsilane (TMS) standard. The $Q^3$ signal occurs at about −98 to −99 ppm relative to TMS. Standard peak fitting programs are used to determine the relative intensities of the two peaks. Spectra can be recorded using a resonance frequency of 39.7 MHz, with a 7.25 millisecond pulse at 90T and a pulse delay of 120 seconds using ZrO2 rotors.

Generally, preferred STS particles may be synthesized by combining at least: water, a silica source, an organic templating agent, and a catalyst to form a mixture used to make STS particles of the invention. The mixture is then aged for a sufficient time to form the particles. Useful silica sources include colloidal silica, precipitated silica, fumed silica, and alkoxysilanes. In preferred embodiments, the silica source is an alkoxysilane, with tetramethoxysilane or tetraethoxysilane being preferred; the organic templating agent is a $C_{14}$ or $C_{16}$ alkylammonium salt surfactant, preferably the chloride or bromide salt (e.g., $C_{16}H_{33}N(CH_3)_3$ Br), the catalyst is ammonium hydroxide or an alkylammonium hydroxide, and the solvent is a 75:25 (wt/wt) water:methanol mixture. Generally, the water to silica molar ratio is greater that about 5. When the catalyst is an acid, for example HCl, typical molar ratios are about 0.02 to about 0.2 moles organic templating agent, 30 to 120 moles water, about 0 to 20 moles co-solvent and about 9 to 20 moles of acid per mole of silica source. If the catalyst is a base, for example ammonium hydroxide or sodium hydroxide, typical molar ratios are about 0.1 to about 0.2 moles organic templating agent, 30 to 120 moles water, about 0 to 20 moles co-solvent, and about 0.3 to 0.5 moles of base per mole of silica source.

Useful organic templating agents include cationic, anionic, and nonionic surfactants. Useful cationic surfactants include alkylammonium salts having the formula $C_nH_{2n+1}N(CH_3)_3X$, where X is OH, Cl, Br, $HSO_4$ or a combination of OH and Cl, and where n is an integer from 8 to 22, and the formula $C_nH_{2n+1}N(C_2H_5)_3X$, where n is an integer from 12 to 18; gemini surfactants, for example those having the formula: $[C_{16}H_{33}N(CH_3)_2C_mH_{2m+1}]X$, wherein m is an integer from 2 to 12 and X is as defined above; and cetylethylpiperidinium salts, for example $C_{16}H_{33}N(C_2H_5)(C_5H_{10})X$, wherein X is as defined above.

Useful anionic surfactants include alkyl sulfates, for example having the formula $C_nH2_{n+1}OSO_3-$, where n is 12 to 18; alkylsulfonates including $C_{16}H_{33}SO_3H$ and $C_{12}H_{25}C_6H_4SO_3Na$; alkyl phosphates, for example $C_{12}H_{25}OPO_3H$, and $C_{14}H_{29}OPO_3K$; and alkylcarboxylic acids, for example $C_{17}H_{35}COOH$ and $C_{14}H_{25}COOH$.

Other useful anionic surfactants include, but are not limited to, alkali metal and (alkyl)ammonium salts of: 1) alkyl sulfates and sulfonates such as sodium dodecyl sulfate and potassium dodecanesulfonate; 2) sulfates of polyethoxylated derivatives of straight or branched chain aliphatic alcohols and carboxylic acids; 3) alkylbenzene or alkynaphthalene sulfonates and sulfates such as sodium laurylbenzene sulfonate; 4) alkylcarboxylates such as dodecylcarboxylates; 5) ethoxylated and polyethoxylated alkyl and aralkyl alcohol carboxylates; and 6) and alkyl phosphates such as ethoxylated dodecyl phosphate.

Useful nonionic surfactants include alkylamines including those having the formula $C_nH_{2n+1}NH_2$, poly(oxyethylene oxides), poly(octaethylene glycol monodecyl ether) ($C_{12}EO_8$), poly(octaethylene glyconyl nonhexadecyl ether) ($C_{16}EO_8$), and poly(alkylene oxide) triblock copolymers such as poly(ethylene oxide)-poly(propylene oxide)-poly(ethylene oxide) (PEO-PPO-PEO) or the reverse (PPO-PEO-PPO). Examples of useful commercially available nonionic copolymer surfactants include those having the tradename PLURONIC and product designations P123, F98, 25R4, and 17R4, available from BASF Corporation, Mount Olive, N.J.

Another useful class of organic templating agents is the ethoxylated amines also called ethoxylated fatty amines. Preferred ethoxylated amines have the formula R—N$(CH_2CH_2O)_xH (CH_2CH_2O)_yH$, wherein x+y=15 and 50 and are commercially available from Akzo Nobel, Chicago, Ill., under the trade designation ETHOMEEN.

Useful catalysts are those compounds which promote hydrolysis/dissolution of the silica source and can promote "inorganic" polymerization. The useful catalysts are generally acids and bases. The acids may be organic or inorganic. Preferred acids include mineral acids such as hydrochloric, sulfuric, hydrobromic, hydrofluoric, and like acids. Useful bases include alkali metal hydroxides such as sodium hydroxide, alkylammonium hydroxides, and like bases. A preferred base is ammonium hydroxide. Optionally, a co-solvent may be added to the mixtures used to make STS particles of the invention to improve solution homogeneity, to modify particle size, and to modify particle morphology. Examples of useful co-solvents include alcohols, esters (for example, acetates), ketones, diols, triols, ethers, amides, and amines. Preferred co-solvents include methanol, ethanol, isopropanol, ethylene glycol, formamide, N,N-dimethylformamide, tetrahydrofuran, and ethyl acetate.

Further, a low dielectric constant liquid can be optionally added to the mixtures used to make STS particles of the invention to increase the pore size of the resulting particles. Examples of useful low dielectric constant liquids include benzene, toluene, mesitylene, toluene, any many other alkanes, alkenes, and aromatics that are described in U.S. Pat. No. 5,057,296 (Beck), incorporated by reference herein.

After combination of all reagents, the resulting mixture is allowed to age from 5 minutes to 1 or more days. The resulting physical gel/colloid is suction filtered and washed with water and/or a lower alcohol, such as ethanol. The washed filtrate typically is dried overnight in a 100° C. drying oven; mechanically ground (on small scale this may be accomplished in a mortar and pestle); the surfactant is removed by either an extraction means such as with water or an acidic alcohol solution, or by calcining the ground filtrate at a temperature sufficient to decompose the surfactant; and milled or shear mixed as an aqueous slurry to break up any particles that have aggregated into a larger agglomerate. The material can be left as an aqueous slurry or dried to a water dispersible powder and then sieved. Slurries are typically 10–40 weight percent solids.

Mean particle size of the calcined material prior to milling or shearing is generally within the range of 0.01–1000 μm. After milling or shearing, the mean particle size is typically within the range of 0.01–100 μm, with more preferred mean particle sizes falling in the range of 0.01–10 μm.

For applications in which transparency of the ink receptor coating is desirable, such as for use as overhead transparencies, transparent STM particles are employed. Transparency results from using particles that have both compatibility with the binder resin and a physical mean size of less than about 100 nm. Preferred transparent STM particles of the invention are STS particles (also called STS nanoparticles). Transparent STS particles of the invention are characterized as having a mean particle size of 100 nm (0.1 μm) or less preferably about 10 to about 50 nm (0.01 to 0.05 μm) and more preferably about 10 to less than 50 nm (0.01 to 0.05 μm), and pore sizes of from greater than 1.5 nm to about 5 nm, preferably from 2 to 4 nm. As used herein, only particles having a mean particle size of 100 nm or less are considered transparent. These transparent particles can be used to form unagglomerated colloidal dispersions that are preferably transparent and stable.

Generally, transparent STS particles of the invention may be synthesized by combining at least water, a silica source, an organic templating agent, an organic acid, and optionally, an appropriate polar solvent. Preferred molar ratios are a polar solvent to water ratio of greater than 1:4 and an organic acid to silica molar ratio of greater than about 9:1. The silica sources, organic templating agents, catalysts, and solvents mentioned above are also useful in making transparent STS particles. A preferred silica source is an alkoxysilane; a preferred organic templating agent is a $C_{14}$ or $C_{16}$ alkylammonium salt surfactant, preferably the chloride or bromide salt (e.g., $C_{16}H_{33}N(CH_3)_3Br$); a preferred catalyst is ammonium hydroxide or an alkylammonium hydroxide; and a preferred solvent is a 75:25 (wt/wt) water:methanol mixture. Useful organic acids include, for example, carboxylic or dicarboxylic acids, for example, acetic, malonic, oxalic, lactic, citric, and tartaric acids with acetic acid being preferred.

STM, and preferably STS particles, can be used to form stable and preferably transparent unagglomerated colloidal dispersions. The mean size of the particles may range from about 500 nm or less, preferably about 150 nm or less, and more preferably about 100 nm or less. The particles have pore sizes of from about 1.5 to about 30 nm, preferably from about 2 to about 10 nm. In the case of a colloidal dispersion resulting from a base-catalyzed preparation, the surface of the particles can be functionalized with a silane coupling agent to yield a stable dispersion. In the case of an acid-catalyzed dispersion, the surface of the particles can be functionalized with a silane coupling agent or stabilized with an appropriate anion of an organic acid to yield a stable dispersion. Alternatively, if desired, the un-functionalized particles can be allowed to grow, aggregate, and precipitate, at which time the particles can be isolated by filtration.

Useful silane coupling agents include, for example, cationic alkoxysilanes with N-(trimethoxysilylpropyl) isothiouronium chloride being preferred. Useful organic acids include for example, carboxylic or dicarboxylic acids for example, acetic, malonic, oxalic, lactic, citric, and tartaric acids with acetic acid being preferred. Carboxylic acids are believed to catalyze the hydrolysis of a alkoxysilanes and stabilize colloidal dispersions by limiting particle growth.

Other STM particles (also called ultra-large pore zeolites and mesoporous silica) that are useful in the receptor compositions and media of the invention include those described in U.S. Pat. Nos. 5,102,643 (Kresge et al.); 5,198,203 (Kresge et al.); and 5,098,684 (Kresge et al.); and their methods of making are described in U.S. Pat. Nos. 5,507,296 (Bales et al.); 5,112,589 (Johnson et al.); 5,108,725 (Beck et al.); 5,110,572 (Calabro et al.); 5,156,829 (McCullen et al.); 5,264,203 (Beck et al.); 5,334,368 (Beck et al.); 5,308,602 (Calabro et al.); 5,304,363 (Beck et al.); 5,145,816 (Beck et al.); and 5,300,277 (Kresge et al.), all of the descriptions of the particles are incorporated by reference herein. These references describe STM particles including those particles that comprise silica, silica and metal, and metal oxides. These particles are characterized as having aggregated particle sizes of typically greater than 0.5 $\mu$m, mean particle size ranges of about 0.5 to greater than 40 $\mu$m, pore sizes of 1.8 to 10 nm, and are frequently faceted.

Polymeric binders

The receptor compositions of the invention contain one or more organic binders. The function of the binder is to adhere the STM particles to each other and/or to the substrate. Preferred binders also provide a receptor that is relatively flexible so to resist cracking and flaking off of the substrate.

Useful binders have glass transition temperatures in the range of about −125° C. to about 125° C., and preferably from about −30° C. to about 30° C. The binders should exhibit good adhesion to the substrate and the STM particles. Useful binders are also compatible with the particular dispersing medium used to disperse the STM particles, for example, water so as to not cause particle agglomeration before the mixture is coated onto a substrate. Preferably, the binder is water resistant or insoluble when the receptor is required to be waterfast. Such binders are preferred because they are less sensitive to atmospheric humidity changes than are water-soluble binders, and the water resistant or insoluble binders provide receptor integrity under wet conditions.

A useful water resistant binder is a cationic latex polymer formed from at least one cationic latex emulsion having less than 10 mole percent of a copolymerizable monomer having a tertamino or quaternary ammonium functionality. The above latex emulsion may also contain greater than 10 mole percent of a monomer having hydroxy functionality. "Cationic" means having a net positive charge. "Mole percent" means weight percent of the compound divided by molecular weight of the component divided by the total number of moles of the composition.

Synthesis of the cationic latex polymer binder is achieved by formulating a premix of monomers intended as the components of the final polymer, together with an initiator. A small portion of this premix is then added to a vessel containing water, a surfactant, and more initiator. This mixture is then vigorously stirred to create droplets of globules of monomer. After mixing, further monomer and initiator may be added. The reaction vessel is heated until formation of a polymer emulsion starts, and then the remainder of the premix is added over an extended time period. Following the addition of all of the premix, the whole mixture may be maintained at a predetermined temperature for a suitable time period to ensure complete reaction of all monomers. The contents of the reaction vessel are then cooled and the finished latex polymer emulsion decanted for storage. Preferably, all of the reagents should be degassed, and the entire reaction carried out in a nitrogen atmosphere.

A wide variety of monomers may be used as starting materials for latex emulsion manufacture. Vinyl monomers such as vinyl acetate, vinyl butyrate, vinyl chloride, and the like may be employed as components of latex emulsions, as may urethane monomers, acrylate monomers, and many others. Preferably, the monomers used are alkyl (meth) acrylate monomers such as ethyl acrylate, methyl acrylate, butyl acrylate, methyl methacrylate, hydroxypropyl acrylate, hydroxyethyl acrylate, quaternary salts of dimethylaminoethyl acrylate, and acidic monomers such as acrylic acid and methacrylic acid.

The above latex emulsions and polymers contain quaternary nitrogen entities, that is, a positively charged quadruple bonded nitrogen atom, and associated therewith a negatively-charged counter ion. These may be selected from a wide variety of anionic entities, for example, chloride and other halide ions, sulfate ions, phosphate ions, organic acid ion, such as acetic and proprionic, ions combining both traditionally organic entities in combination such as methyl sulfate ions and the like. The most convenient, but not the only, way of incorporating the desired amount of quaternary nitrogen functions into the latex emulsion is by incorporating a monomer suitably substituted with a quaternary nitrogen in the initial and un-polymerized monomer mixture. Alternatively, a suitable monomer that could be further reacted to attach a quaternary function could also be used.

The polymer particles in the latex emulsion are generally spherical with mean particle sizes below 500 nm. Emulsions containing particle sizes in this range are nearly or completely transparent. Size may be quite variable but typical mean particle sizes are 50–400 nm, preferably from 50 to 150 nm, and more preferably from 75 to 125 nm.

For applications where the receptor does not need to be waterfast, the binders may be water soluble or water swellable. Water soluble or water swellable binders have the advantage in that they can also absorb aqueous inks. However, water soluble or water swellable binders are also more sensitive to atmospheric humidity changes.

Examples of useful commercially available organic binders include, but are not limited to, CARBOSET™ GA2136 (an acrylic copolymer, available from B. F. Goodrich, Cleveland, OH); RHOPLEX™ 2438, RHOPLEXTM B-60A, MAINCOTETM HG-54D (acrylic copolymers, available from Rohm & Haas, Philadelphia, Pa.); and AIR-VOL™ 523 (a polyvinyl alcohol, available from Air Products and Chemicals, Allentown, Pa.).

Alternatively, the binder may be a melt-processable resin which may also function as a substrate. In this case, the STM particles would be included in the extrudate; that is, extruded with the resin binder/substrate as one unit. The extrudate may also include an ink fixing agent or the ink fixing agent may be added afterwards. Examples of such binder/substrate resins include polyethylene and polypropylene. The extrudate may also be stretched to induce additional porosity in the substrate.

Generally, the STM particle:binder ratios may range from approximately 1:40 to 40:1 by weight depending upon the composition of the specific particles and binder used. A preferred STS particle:binder ratio ranges from 1:9 to 9:1. One of ordinary skill in the art can easily choose the appropriate particle:binder ratio so to optimize scratch resistance, print performance, cost, etc., using the ratios above without undue experimentation. The flexibility and scratch resistance of the receptor system is largely controlled by the glass transition temperature ($T_g$) of the binder. The flexibility of the receptor system increases with decreasing $T_g$, whereas scratch resistance generally increases with increasing $T_g$. Thus, these two characteristics are balanced when choosing a binder. For example, for outdoor applications, binder materials having a $T_g$ near −15° C. provide a balance of flexibility and scratch or abrasion resistance for receptor compositions having an STM:binder ratio of approximately 3:1 by weight.

Ink Fixing Agent

A material that provides further water resistance and pigment or dye fixing may be provided in or over part or all of the ink receptor. If an ink fixing agent is desired, the ink fixing agent is preferably incorporated into the receptor composition. Otherwise, if the ink fixing agent is not compatible with any other component in the ink receptor mixture, the ink fixing agent may be provided over the ink receptor. These materials are primarily cationic polymers and/or inorganic salts having a multivalent cation. The cationic polymers are believed to mordant dyes and pigment particles. The multivalent metal salts are believed to serve as reagents to rapidly destabilize dispersants surrounding the pigment particles in the ink, whereby the pigment particles coagulate or flocculate as the remainder of the ink fluid continues along the surfaces of the receptor medium. The metal salts are soluble in water for both preparing coating solutions and during imaging, but not soluble in water after complexing with the dispersing aid that surrounds the pigment particles in the ink.

Nonlimiting examples of inorganic multivalent metal salts useful in the present invention include the metal cations from Groups 2 through 16 inclusive in the Periodic Table, such as Ca, Mg, Ti, Zr, Fe, Cu, Zn, Ta, Al, Ga, Sn, with counter ions such as sulfate, nitrate, bisulfate, chloride, aromatic carboxylates and sulfocarboxylates (e.g., sulfophthalates), and the like.

Specific examples of preferred salts include aluminum sulfate, aluminum nitrate, gallium nitrate, ferrous sulfate, chromium sulfate, zirconium sulfate, magnesium sulfophthalate, copper sulfophthalate, zirconium sulfophthalate, zirconium phthalate, zinc sulfate, zinc acetate, zinc chloride, calcium chloride, calcium bromide, magnesium sulfate, magnesium chloride, aluminum sulfophthalate, aluminum sulfoisophthalate, and combinations thereof. These compounds are typically sold and can be used in the hydrated form. Of the various possible salts, aluminum sulfate and aluminum sulfophthalate are presently preferred.

The amount of salts that can be used in the coating solution for coating the receptors of the present invention can range from about 0.1 weight percent to about 50.0 weight percent, and preferably from about 0.5 weight percent to about 10.0 weight percent.

Substrates

Generally, the substrate of the receptor media of the invention can have a solid or porous surface which may be composed of, for example, glass, wood, metal, a polymeric film, or a porous material such as a membrane and non-woven material. The substrate may be flexible or rigid and is preferably flexible. Useful polymeric films include polyester, polyolefin, polyamide, polycarbonate, polyurethane, polystyrene, polyacrylate, poly(meth) acrylate, polyvinyl chloride, and combinations thereof. The substrates may be provided in the form of films, sheets, or tapes, any of which may be provided from a continuous roll with or without perforations.

As used herein, "porous surface" means or includes any material that has voids and includes materials that are considered to be microporous and macroporous. Other useful materials include woven and non-woven fabrics (for example, polypropylene, polyethylene, polyester, polyamide, polyurethane, polyacrylate, polymethacrylate, or combinations thereof), membranes, virtually any type of melt-blown or spunbonded fibrous substrates and pulp or paper materials having the desirable strength and integrity.

Ink receptor media

The receptor media of the invention are very easily made. STM particles are first dispersed in a solvent, preferably water, and a polymeric binder and (optionally) a surfactant and/or ink fixing agent is added to the dispersion. The homogeneous mixture is coated onto a substrate by means such as knife coating, Mayer rod, spraying, dipping, etc., then dried in an oven at a temperature which evaporates the solvent but does not distort or melt the substrate, preferably about 110° C. Optionally, a solution of an ink fixing agent (optionally, with additional surfactant) in a solvent, preferably distilled water, may be coated on top of the dried receptor composition, followed by drying in an oven at a temperature which evaporates the solvent but does not distort or melt the substrate.

Alternatively, the STM particles and ink fixing agent if desired may be coextruded with a polyolefin binder using known procedures to form a free standing film. This film may also function as the substrate or may be attached (e.g., by adhesives or coextrusion) to another substrate as desired.

An ink receiving medium of the present invention has two major opposing surfaces and can be employed for printing (for example, by inkjet methods) on both surfaces. Optionally, one of the major surfaces can be dedicated for the purpose of adhering the finished image graphic to a supporting surface such as a wall, a floor, or a ceiling of a building, a sidewall of a truck, a billboard, or any other location where an excellent quality image graphic can be displayed for education, entertainment, or information.

Minnesota Mining and Manufacturing Company, St. Paul, Minn., offers a variety of image graphic receptor media and has developed an array of pressure-sensitive adhesive formulations that can be employed on the major surface opposing the surface intended for imaging. Among these adhesives are those disclosed in U.S. Pat. Nos. 5,141,790 (Calhoun et al.); 5,229,207 (Paquette et al.); 5,800,919 (Peacock et al.); 5,296,277 (Wilson et al.); 5,362,516 (Wilson et al.); EPO Patent Publication No. EP 0 570 515 B1 (Steelman et al.), and co-pending, co-assigned U.S. patent application Ser. Nos. 08/775,844 (Sher et al.), and 08/664,730 (Peloquin et al.).

Any of these adhesive surfaces should be protected by a release or storage liner such as those commercially available from Rexam Release, Bedford Park, Ill. Alternatively to adhesives, mechanical fasteners can be used if laminated in some known manner to that opposing major surface of the receptor of the present invention. Nonlimiting examples of mechanical fasteners include hook and loop, VELCRO™, SCOTCHMATE™, and DUAL LOCK™ fastening systems, as disclosed in published PCT Patent Application No. WO 98/39759 (Loncar), the disclosures of which are incorporated by reference herein.

While the imaging major surface is not covered before imaging, after imaging, an optional layer may be applied to that imaged major surface to protect and enhance the image quality of the image on the receptor. Nonlimiting examples of optional layers are overlaminates and protective clear coatings commercially available from Minnesota Mining and Manufacturing Company from its Commercial Graphics Division and those disclosed in U.S. Pat. No. 5,681,660 (Bull et al.), the disclosure of which is incorporated by reference herein. Other products known to those skilled in the art can also be used.

EXAMPLES

All chemicals used in the following examples, unless otherwise specified, may be obtained from standard chemical vendors such as Aldrich Chemical Co., Milwaukee, Wis. Deionized water used in the examples below had a resistance of at least (18 MΩ). All amounts are by weight unless specified otherwise.

"ADVERA 403" and "ADVERA 401P" are trade designations for zeolites, available from The PQ Corp., Valley Forge, Pa.

"AIRVOL 523" is a trade designation for polyvinyl alcohol, available from Air Products and Chemicals, Allentown, Pa.

"RHOPLEX B-60A", "RHOPLEX 2438", "RHOPLEX AC-1230M", and "MAINCOTE HG-54D" are trade designations for latex binder emulsions, available from Rohm and Haas Co.

"CARBOSET GA2136" is a trade designation for a latex binder emulsion, available from B. F. Goodrich Co., Cleveland, Ohio.

"FLUORAD FC-754" surfactant is a trade designation for a ~50 percent solids solution of $C_8F_{17}SO_2NHC_3H_6N(CH_3)_3{}^+I^-$ having a F.W.=726.9, available from Minnesota Mining and Manufacturing Company.

"ZONYL FSO" is a trade designation for a fluorinated surfactant, available from E I DuPont de Nemours Corp., Wilmington, Del.

"ELEVES T0703WDO" is a trade designation for a polyester core/polyethylene sheath fiber spunbonded substrate having a basis weight of 70 g/m$^2$ and a thickness of 0.25 mm, available from Unitika, Ltd., Osaka, Japan.

"REEMAY 2033" is a trade designation for a spunbonded polyester, having a basis weight of 100 g/m$^2$ and 0.44 mm thickness, available from Reemay, Inc., Old Hickory, Tenn.

"PLURONIC" is a trade designation for triblock copolymers of polyethylene oxide-polypropylene oxide-polyethylene oxide, available from BASF Corp. "PLURONIC P123" is a 30 weight percent polyoxyethylene with a 3600 MW polyoxypropylene segment; "PLURONIC F77" is a 70 weight percent polyoxyethylene with a 2100 MW polyoxypropylene segment; "PLURONIC P85" is 50 weight percent polyoxyethylene with a 2400 MW polyoxypropylene segment; "PLURONIC F98" is an 80 weight percent polyoxyethylene with a 2700 MW polyoxypropylene segment; "PLURONIC P103" is a 30 weight percent polyoxyethylene with a 3000 MW polyoxypropylene segment; and "PLURONIC P104" is a 40 weight percent polyoxyethylene with a 3000 MW polyoxypropylene segment.

"ETHOMEEN" is a trade designation forethoxylated amines having the formula $(R—NCH_2CH_2O)_xH(CH2CH_2O)_yH$, available from Akzo Nobel, Chicago, Ill. ETHOMEEN 18/25 and ETHOMEEN 18/60 are octadecylamines in which x+y=15 and x+y=50 respectively.

"MAGIC DMPB10 INKJET BANNER FILM" is a trade designation for an ink receptor substrate, 10 mil polyethylene base, available from Rexam Graphics Inc., South Hadley, Mass.

The term "PET" used in the examples below means polyethylene terephthalate.

Waterfastness Test Method

An imaged substrate to be evaluated was tested by rinsing under tap water on the image and/or soaking the image in a beaker of water. An image was determined to be waterfast if the rinsate was colorless, and the image was not degraded in quality.

Examples 1–13 Describe STS Particle Preparations

Example 1

This example describes a synthesis of STS particles using ammonium hydroxide and an aqueous slurry of STS particles derived therefrom.

Tetradecyltrimethylammonium bromide (40 g, abbreviated hereinafter as $C_{14}TAB$) was combined with 490 g methanol, 980 g deionized water, and 490 g concentrated ammonium hydroxide (27.5–29 weight percent aqueous) in a 4-L glass jar. The solution was magnetically stirred until the $C_{14}TAB$ completely dissolved.

To this, 128 g of tetramethoxysilane (abbreviated hereinbelow as TMOS) was added rapidly and the resulting opaque white gel (which formed in ~3 seconds) was shaken by hand for ~30 seconds. The final molar weight ratio was 1.00

TMOS:0.13 $C_{14}$TAB:56 water:18 methanol:4.6 ammonium hydroxide. The white gel, which had a pH of about 11, was allowed to stand overnight, then filtered and washed with water. The filter cake was dried overnight in a vented 100° C. oven. The dried cake was ground in a large alumina mortar. 74.56 g were calcined in flowing nitrogen at 550° C. for 1.5 hours (10° C. ramp rate), cooled, and calcined in flowing air at 550° C. for 6 hours (10° C. ramp rate).

To 47.8 g powdered STS thus prepared, was added 159 mL of deionized water to form a 23 weight percent aqueous slurry. This was ground in a 1-L capacity ball mill for 2.5 hours to deaggregate the particles.

SEM indicated 250–400 nm spherical and ellipsoidal primary particles with a small fraction of <50 nm primary particles.

Example 2

This example describes another preparation of an aqueous slurry of STS particles.

A sample was prepared with reagent ratios identical to Example 1. The TMOS was contained in a separatory funnel and added to the other reagents over 2.5 minutes. The reaction was agitated with a high shear mixer for 5 minutes with increasing shear rate from 500 to 14000 rpm. The pH=11 white gel was allowed to stand overnight and was filtered and washed with water. The filter cake was dried overnight in a vented 100° C. oven. The dried cake was ground in a large mortar. 81.14 g were calcined in flowing air at 550° C. for 6 hours (10° C. ramp rate). To 20 g of this calcined material was added 46.7 mL deionized water to form a 30 weight percent aqueous slurry. This was shear mixed at 1000 rpm for 2 minutes using an OMNI Mixer ES and turned from a thick paste to a flowable slurry over this time.

XRD indicated 1 peak at 3.46 nm in the uncalcined sample. SEM indicated 250–500 nm spherical and ellipsoidal primary particles with a small fraction of <50 nm primary particles. Jagged fracture surfaces were evident on some particles.

Example 3

This example describes another preparation of STS particles.

Cetyltrimethylammonium bromide (36 g, abbreviated hereinbelow as $C_{16}$TAB), was combined in a 4-L glass jar with 4g "FLUORAD" FC-754 surfactant, 1470 g deionized water, and 480 g concentrated ammonium hydroxide (27.5–29 weight percent aqueous). To this milky, opaque, slightly yellow solution, was rapidly added 28.8 g TMOS, and the resulting opaque white gel (which formed in ~3 seconds) was shaken by hand for about 30 seconds. The resultant molar weight ratio was 1.00 TMOS:0.12 $C_{16}$TAB:0.0033 FC-754 surfactant:120 water:4.6 ammonium hydroxide. The capped jar was allowed to stand quiescent overnight. The jar was shaken by hand to break up the resultant gel and suction filtered with a Büchner funnel. The filter cake was thoroughly washed with ~1 L of deionized water. The cake was dried in air for 3 days. A portion of the dried cake (83.87 g) was ground by hand and loaded into a 6 cm wide×50 cm long×2 cm deep hemispherical quartz boat.

The material was calcined in a large tube furnace (~3 ft hot zone) at 550° C. for 1 hour in a tube furnace with flowing nitrogen. The initial ramp from room temperature was 1 hour; the cool down was with the power to the furnace off. About 44.1 percent of the initial weight was lost. The brown/tan powder was hand ground with a mortar and pestle. The powder was calcined again at 550° C. for 6 hours in a tube furnace with flowing argon and then the same profile with flowing air. The initial ramp from room temperature was 50 minutes; the cool down was with the power to the furnace off. The recovered white powder (46.512 g) was added to 450 mL isopropanol and ground in a ball mill for ~1–2 hours. The isopropanol was evaporated and the dried powder was passed through a No. 100 sieve.

XRD indicated 4 Bragg peaks in the uncalcined material (a=4.51 nm) in the uncalcined sample. SEM indicated a bimodal distribution of particle sizes: 100–1000 nm spherical and ellipsoidal primary particles plus large 10–30 μm faceted platelets (some substructure).

Example 4

This example describes another preparation of STS particles using a modified cosolvent:water molar weight ratio.

$C_{16}$TAB (80 g) was combined with 200 g methanol, 980 g deionized water, and 980 g concentrated ammonium hydroxide (27.5–29 weight percent aqueous) in a 4-L glass jar. To this translucent solution was rapidly added 257.6 g TMOS. The resulting opaque white gel (which formed in ~3 seconds) was shaken by hand for about 30 seconds. The final molar weight ratio was 1.00 TMOS:0.13 $C_{16}$TAB:55 water:3.7 methanol:4.6 ammonium hydroxide. The capped jar was allowed to stand quiescent for 3 days. The gel was shaken by hand to break it up and suction filtered with a Büchner funnel. The filter cake was thoroughly washed with ~0.6–0.8 L (total) deionized water and methanol. The cake was put into a 100° C. vented drying oven overnight. The dried cake was ground by hand and 167.64 g of the powder was loaded into a 6 cm wide×50 cm long×2 cm deep hemispherical quartz boat.

The material was calcined with the procedure described in Example 3 above. XRD indicated 3 diffraction peaks prior to calcination (a=4.51 nm). Scanning electron microscopy indicated spherical and ellipsoidal particles 0.05–1.30 μm in size, some with facets.

Example 5

This example describes another preparation of STS particles with an aluminosilicate framework using sodium hydroxide catalysis.

$C_{16}$TAB (40 g) was combined with 1862 g deionized water and 19.5 g 50 weight percent aqueous sodium hydroxide in a 4-L glass jar and heated to 50° C. to form a transparent solution. In a separate bottle, 20.79 g aluminum sec-butoxide was combined with 98 g isopropanol and 128.8 g TMOS. The solution was mixed for <5 minutes. This turbid solution was added to the surfactant solution. The resulting opaque white gel (which formed in ~10–15 seconds) was shaken by hand for about 1–2 minutes. The final molar weight ratio was 1.00 TMOS:0.13 $C_{16}$TAB:122 water:1.9 isopropanol:0.29 sodium hydroxide. The capped jar was allowed to stand quiescent overnight. The gel was shaken by hand to break it up and suction filtered with a Büchner funnel. The filter cake was thoroughly washed with 200–300 mL deionized water. The cake was put into a vented drying oven at 100° C. vented and allowed to remain overnight. The dried cake was ground by hand and 96.18 g of the ground cake was loaded into a 6 cm wide×50 cm long×2 cm deep hemispherical quartz boat.

The material was calcined with the procedure described in Example 3 above. XRD indicated 1 diffraction peaks after calcination (a=3.8 nm).

Example 6

This example describes another preparation of STS particles using a swelling agent.

$C_{16}$TAB (40 g) was combined with 1470 g deionized water, 490 g ammonium hydroxide (27.5–29 weight percent aqueous), and 117 g toluene in a 4-L glass jar. The solution was heated at 35° C. to dissolve all of the reagents. To this solution was added 209 g TMOS with vigorous stirring, which resulted in an opaque white gel in 5 seconds. The final molar weight ratio was 1.00 TMOS:0.13 $C_{16}$TAB:120 water:4.6 ammonium hydroxide:1.5 toluene. The stoppered jar was allowed to stand overnight. The gel was shaken by hand to break it up and suction filtered with a Büchner funnel. The filter cake was thoroughly washed with deionized water.

The material was calcined with the procedure described in Example 3 above. XRD of the calcined powder gave a cell constant of ~4.5 nm.

Example 7

This example describes another preparation of STS particles using ammonia gas catalysis.

$C_{14}$TAB (20 g) was combined with 192.3 g methanol, 735 g deionized water, and 64.5 g TMOS in a 10-L metal bucket. The solution was allowed to sit for 5 minutes and then gaseous ammonia was diffused over this rapidly stirred mixture. The solution gelled in ~25 seconds. The final molar weight ratio was 1.00 TMOS:0.13 $C_{14}$TAB:97 water:25 methanol. The beaker was allowed to sit overnight. The gel was shaken by hand to break it up and suction filtered with a Büchner funnel; the pH was >10. The filter cake was thoroughly washed with deionized water.

SEM indicated primary particles 50–200 nm in size.

Example 8

This example describes another preparation of STS particles using tetraethoxysilane as the silica source.

$C_{14}$TAB (16.75 g) was combined with 463.2 g methanol and 348 mL concentrated ammonium hydroxide (27.5–29 weight percent aqueous). The clear solution was stirred at 200 rpm using a magnetically driven stirrer for several minutes. To this solution was added 64.5 g tetraethoxysilane (abbreviated hereinafter as TEOS). Within 2 minutes, the mixture turned completely white and suspended powder was present. The mixture stirred overnight at 200 rpm. The particles were allowed to settle out and were then filtered.

The material was calcined with the procedure described in Example 3 above.

SEM indicated primary particles 400–1400 nm in size. Some particles were aggregated and necked.

Example 9

In a five-gallon bucket with a polypropylene liner were mixed 237 g $C_{16}$TAB, 3.69 L methanol, 5.81 L deionized water, and 3.23 L concentrated ammonium hydroxide (27.5–29 weight percent aqueous). The solution was agitated with an overhead air driven stirrer. To the stirred solution, 734 mL TMOS was added over about 20 seconds. The sample gelled about 10 seconds after the TMOS was first added. The gelled solution was stirred for ~1 minute after the last amount of TMOS was added. The final molar weight ratio was 1.00 TMOS:0.13 $C_{16}$TAB:87 water:18 methanol:4.8 ammonium hydroxide. The bucket was allowed to stand quiescent overnight. The slurry was suction filtered with a Büchner funnel. The filtered solids were thoroughly washed with several L of deionized water and put into a 100° C. vented drying oven overnight. The dried powder was ground by hand. The dried material was calcined at 550° C. for 6 hours in a tube furnace with flowing air. Five separate runs were required to calcine all of the powder. The initial ramp from room temperature was 50 minutes; the cool down was with the power to the furnace off. The resulting powder was partitioned into two samples (135 g and 156 g). Each sample was ball milled in a 1-L mill for 2–4 hours. The final suspensions were 23 weight percent solids.

Particle size analyses with a Coulter 4+ instrument indicated mean particle sizes were 664 nm±124 nm and 720±178 nm for the two fractions. The fractions were combined for further use.

Example 10

This example describes a preparation of STS particles using acid catalysts.

$C_{16}$TAB (40 g) was combined with 620 mL methanol, 762 g deionized water, and 708 mL concentrated hydrochloric acid (38 weight percent aqueous) in a 4-L beaker. The solution was agitated with an overhead air-driven mixer. To this solution was added rapidly 62.5 mL TMOS. After ~1.5 minutes, the solution turned opaque. The solution was stirred for 12 minutes. There was much foam on the top of the liquid. The final molar weight ratio was 1.00 TMOS:0.26 $C_{16}$TAB:18 water:36 methanol:21 hydrochloric acid.

The sample was suction filtered and washed with 3 L of water plus ethanol. The dried powder (23.19 g) was added to 1 L of 0.1 M HCl in ethanol and allowed to stir at 400 rpm for 67 hours. The suspension was filtered and washed with about 100 mL deionized water. The material mixed with 53 g deionized water to form an ~30 weight percent suspension. This suspension was milled for about 16 hours.

From light scattering measurements using a Coulter N4+ particle size analyzer, the mean particle size after deagglomeration is 1637±873 nm. XRD revealed one broad diffraction peak at 3.50 nm, indicating periodic mesoporosity.

Example 11

This example describes the preparation of STS particles using acetone as the cosolvent.

$C_{16}$TAB (80 g) was combined with 57 mL acetone, 69.5 mL deionized water, and 175 mL concentrated hydrochloric acid (38 weight percent aqueous) in a 4-L beaker and agitated with an overhead stirrer. To this was added rapidly 250 mL TMOS. Within 30 seconds, the solution turned opaque and gelled. The final molar weight ratio was 1.00 TMOS:0.13 $C_{16}$TAB:6.6 water:0.46 acetone:1.3 HCl.

The sample was washed with 6 L of water plus ethanol. The solution was added to 1.5 L of 0.1M HCl in ethanol and allowed to sit overnight. The suspension was filtered and washed with about 300 mL deionized water. The material was dried at 150° C. and then mixed with 230 g deionized water to form an ~30 weight percent suspension. This suspension was milled for about 3 days. The final pH of the suspension was about 1.9.

The mean particle size as measured with light scattering on a Coulter N4+ is 792±75 nm. XRD indicated one very weak peak at about 3.5 nm, indicating a mesoporous material.

Example 12

This example describes the preparation of STS particles using acetone as the cosolvent.

$C_{16}$TAB (80 g) was combined with 57 mL methanol, 69.5 mL deionized water, and 175 mL concentrated hydrochloric acid (38 weight percent aqueous) in a 4-L beaker and agitated with an overhead stirrer. To this was added rapidly 250 mL TMOS. Within 15 seconds, the solution turned opaque and gelled. The final molar weight ratio was 1.00 TMOS:0.13 $C_{16}$TAB:6.6 water:0.83 acetone:1.3 HCl. The synthetic solution is approximately 27 weight percent silica plus surfactant.

The sample was washed with ~2 L water. The powder was added to 1.00 L of 0.1M HCl in ethanol and stirred with an overhead stirrer for 1.5 hours. The material was dried at 150° C. and then mixed with 348 g deionized water to form an ~25 weight percent suspension. This suspension was milled for about 10 hours in a ball mill with a 1-L total capacity. The particle size range was 1–2 µm. X-ray diffraction indicated one very weak peak at about 3.5 nm, indicating a mesoporous material.

Example 13

This example describes a preparation of STS particles using TEOS.

$C_{16}$TAB (20 g) was combined with 310 mL methanol, 400 mL deionized water, and 530 mL concentrated hydrochloric acid (38 weight percent aqueous) in a 4-L beaker and agitated with an overhead stirrer. To this was added rapidly 86 mL tetraethoxysilane. Within 3 minutes, the solution turned opaque. The solution was allowed to stand overnight. The final molar weight ratio was 1.00 TEOS:0.14 $C_{16}$TAB:11 water:20 methanol:17 HCl.

The sample was suction filtered, stirred with ~1 L deionized water for 45 minutes, and filtered again. The powder was added to 1.00 L of 0.1M HCl in ethanol in a 2-L capacity round-bottom flask and magnetically stirred for 6 hours. The material was dried at 150° C. and then 23.3 g was mixed with 69.9 g deionized water to form an ~25 weight percent suspension. This suspension was milled for about 13 hours in a ball mill with a 1-L total capacity. The sample was quite foamy; 3 mL of ethanol was added to defoam the sample. The particle size range was 1–6 µm. Particles were spherical and ellipsoidal.

XRD indicated one peak at about 3.58 nm, indicative of a mesoporous material.

Preparation of Ink Receptor Media

Examples 14–24 Employ Compositions A through C

Composition A: A mixture of 75 parts STS powder, 25 parts binder (on a solids basis) and 200 parts water (including water from the binder resin).
Composition B: A mixture of 10 parts aluminum sulfate octadecahydrate and 90 parts water.
Composition C: A mixture of 75 parts STS powder, 20 parts RHOPLEX B-60A (on a solids basis), 5 parts RHOPLEX AC-1230M (on a solids basis), and 300 parts water (including water from the binder resin).

Examples 14(a)–14(c)

These examples demonstrate ink receptive articles comprising STS and aluminum sulfate coated onto a polyester film substrate:
(a) Composition A was prepared using STS powder prepared according to Example 1, and with CARBOSET GA2136 as the binder. The mixture was coated onto a PET substrate using a #40 Mayer rod to give a nominal wet film thickness of 0.091 mm, then dried in an oven at 110° C. for approximately 5 minutes. Composition B was then coated on top of the dried Composition A coating using a #10 Mayer rod (nominal wet thickness=0.023 mm), followed again by drying in an oven at 110° C. for approximately 3 minutes. This material was then printed using a Hewlett-Packard Design Jet 2500CP inkjet printer, available from Hewlett-Packard Corp., Palo Alto, Calif., using cartridge numbers C1892A, C1893A, C1894A, and/or C1895A. The resulting image exhibited high color density, high gloss, and excellent line sharpness with no bleed or feathering between colors. Upon subjecting the image to running water, there was no mobility of any color. Soaking the image in water for 24 hours resulted in no color movement nor any appreciable change in color density.
(b) The procedure of Example 14(a) was repeated except that RHOPLEX 2438 was substituted for CARBOSET GA2136. Results were similar in image quality and waterfastness to that of Example 14(a).
(c) The procedure of Example 14(a) was repeated except that MAINCOTE HG-54D was substituted for CARBOSET GA2136. Results were similar in image quality and waterfastness to that of Example 14(a).

Examples 15(a)–15(c)

These examples demonstrate ink receptive articles comprising STS and aluminum sulfate coated onto a polyester film substrate.
(a) An ink receptive article was prepared according to the procedure of Example 14(a), except that the STS used was prepared according to Example 4, and CARBOSET GA2136 was used as the binder. Results were similar in image quality and waterfastness to that of Example 14(a).
(b) The procedure of Example 15(a) was repeated, except that RHOPLEX 2438 was substituted for the CARBOSET GA2136. Results were similar in image quality and waterfastness to that of Example 14(a).
(c) The procedure of Example 15(a) was repeated, except that MAINCOTE HG-54D was substituted for the CARBOSET GA2136. Results were similar in image quality and waterfastness to that of Example 14(a).

Examples 16(a) and 16(b)

This example demonstrates an ink receptive article comprising STS and aluminum sulfate coated onto a polyethylene/PET spunbond substrate.
(a) An ink receptive article was prepared according to the procedure of Example 14(a) using STS prepared according to the procedure of Example 1, and CARBOSET GA2136 as the binder. The mixture was coated onto ELEVES T0703WDO spunbond substrate. Results were similar in image quality and waterfastness to that of Example 14(a).
(b) An ink receptive article was prepared according to the procedure of Example 14(a) using STS prepared according to the procedure of Example 4, and CARBOSET GA2136 as binder. The mixture was coated onto ELEVES T0703WDO spunbond substrate. Results were similar in image quality and waterfastness to that of Example 14(a).

Examples 17(a) and 17(b)

These examples demonstrate ink receptive articles comprising STS and aluminum sulfate coated onto a polyester film substrate.

(a) An ink receptive article was prepared according to the procedure of Example 14(a) using STS from Example 3, and CARBOSET GA2136 as binder. Results were similar in image quality and waterfastness to that of Example 14(a).

(b) The procedure of Example 17(a) was repeated with the addition of 1 weight percent ZONYL FSO surfactant to the STS/binder coating solution. Results were similar in image quality and waterfastness to that of Example 14(a).

Example 18

These examples demonstrate ink receptive articles comprising STS and aluminum sulfate in a water soluble binder coated onto a polyester film substrate.

Composition A was prepared using STS prepared according to the procedure of Example 1 and AIRVOL 523 as the binder. The mixture thus prepared (300 parts) was further blended with 10 parts aluminum sulfate octadecahydrate. This composition was coated onto a PET substrate using a #40 Mayer rod (nominal wet thickness=0.091 mm), then dried in an oven at 110° C. resulting in an ink receptive article. The ink receptive article was printed according to the procedure of Example 14(a). The resulting print exhibited high color density, high gloss for the black, and excellent line sharpness with no bleed or feathering between colors. Results were similar in image quality to that of Example 14(a), but not waterfast due to the water soluble binder.

Examples 19(a)–19(d)

These examples demonstrate ink receptive articles comprising STS and aluminum sulfate coated onto a polyolefin film substrate.

(a) An ink receptive article was prepared according to the procedure of Example 14(a) using STS prepared according to Example 9 with RHOPLEX 2438 binder coated onto a polyolefin film as described in Example 5 of U.S. Pat. No. 5,721,086 (Emslander et al.). Results were similar in image quality and waterfastness to that of Example 14(a).

(b) The procedure of Example 19(a) was repeated except that a 50/50 blend of MAINCOTE HG-54D/ RHOPLEX 2438 was substituted as binder. The resultant ink receptive article when imaged had comparable image quality and improved scratch resistance.

(c) The procedure of Example 19(a) was repeated except that RHOPLEX AC-1230M was substituted as binder. The resultant ink receptive article when imaged had comparable image quality and improved scratch resistance.

(d) The procedure of Example 19(a) was repeated except that an 80/20 blend of RHOPLEX B-60A/RHOPLEX AC-1230M was substituted as binder. The resultant ink receptive article when imaged had comparable image quality and improved scratch resistance.

Examples 20(a)–20(c)

These examples demonstrate ink receptive articles comprising STS coated onto a polyolefin film substrate.

(a) Composition C using STS prepared in Example 9 as the STS was coated using a knife coater at 0.203 mm gap and drying temperature of 95° C. onto a polyolefin film used in Example 19(a). This material was then printed as described in Example 14(a). The resulting image exhibited high color density, high gloss, and excellent line sharpness with no bleed or feathering between colors.

(b) The same procedure as in Example 20(a) except using zeolite type Ca-A (ADVERA 403) as the silica was performed. This material was then printed with UV inks as described in Example 14(a). The resulting image exhibited ink flooding, bleed/feathering between colors and lower color density than that of Example 20(a).

(c) The same procedure as in Example 20(a) except using zeolite type Na-A (ADVERA 401P) as the silica was performed. This material was then printed as described in Example 14(a). The resulting image exhibited ink flooding, bleed/feathering between colors, lower color density than that of Example 20(a). Results are shown in the following table.

| COLOR DENSITY MEASUREMENTS USING HP2500CP PIGMENT INKS | | | | | | | |
|---|---|---|---|---|---|---|---|
| | Cyan | Magenta | Yellow | Black | Red | Green | Blue |
| Example 20 (a) | 1.20 | 1.60 | 1.83 | 2.34 | 2.13 | 1.95 | 1.87 |
| Example 20 (b) | 1.40 | 1.35 | 1.37 | 1.45 | 1.36 | 1.34 | 1.40 |
| Example 20 (c) | 1.21 | 0.97 | 1.36 | 1.56 | 1.32 | 1.31 | 1.31 |
| DMPB10[1] comparative | 1.01 | 1.05 | 1.09 | 1.38 | 1.17 | 1.13 | 1.29 |

[1]MAGIC DMPB10 Inkjet Banner Film

Optical densities were measured on the printed samples using a Gretag SPM-55 densitometer, available from Gretag-MacBeth AG, Regensdorf, Switzerland, subtracting the density of the unprinted area of the samples as background.

Examples 21–24 Describe Various Embodiments of Acid-Catalyzed STS Ink Receptive Articles Without Aluminum Sulfate Example 21

These examples demonstrate ink receptive articles comprising STS with a cationic binder coated onto a polyester substrate.

The synthesis of the cationic latex polymer used in this example is as follows.

A reaction vessel was fitted with a condenser, a thermometer, a dropping funnel, a mechanical stirrer, and a nitrogen purging system. To this vessel was added 393 parts of deionized water, 5 parts of cetyl(trimethyl)ammonium chloride (as a 25 percent solution in water), and 0.4 parts of V-50. "V-50" is the trade designation for 2,2'-azobis(2-amidinopropane)dihydrochloride, (CAS #2997-92-4) used by Wako Chemicals USA, Inc., Richmond, Va. The solution was left to stir at 300 rpm. In a separate container, a pre-mix of 33 parts of methyl methacrylate (CAS #80-62-6), 33 parts of ethyl acrylate (CAS #140-88-5), 30 parts of hydroxypropyl acrylate, (CAS #25584-83-2), and 5 parts (acryloxyethyl)trimethylammonium chloride (CAS #44992-01-0), available from Lancaster Synthesis, Inc., Pelham, N.H., (as 80 percent solids in water) was made. Ten parts of this pre-mix were added to the reaction vessel, and the vessel contents heated to 50° C. A bluish coloration appeared indicating the formation of a latex emulsion. The remainder of the pre-mix was added over a period of 2 hours. The reaction mixture was then maintained at the same temperature for a further 4 hours. The reaction was carried out under a steady purge of nitrogen gas. Completion of the reaction was monitored by percent solids measurement. The contents of the reactor were cooled and decanted into a storage container.

Composition A using STS prepared according to Example 10 and the cationic binder described above was coated onto a PET substrate using a #60 Mayer rod (nominal wet thickness=0.137 mm), then dried in an oven at 110° C. This material was then printed as described in Example 14(a). The resulting image exhibited high color density, excellent line sharpness with no bleed or feathering between colors, and waterfastness.

Examples 22(a) and 22(b)

These examples demonstrate ink receptive articles comprising STS particles and a cationic binder coated onto a polyester substrate.

(a) Composition A using STS prepared according to Example 11 with the cationic latex polymer binder of Example 21 was coated onto a PET substrate using a #60 Mayer rod (nominal wet thickness=0.137 mm), then dried in an oven at 110° C. This material was then printed as in Example 14(a). The resulting image exhibited high color density, excellent line sharpness with no bleed or feathering in the primary colors, and waterfastness.

(b) The same materials as in Example 22(a) was printed using ENCAD NOVAJET PRO printer using Encad Graphic Standard inks (part nos. 206832 cyan dye ink, 206833 magenta dye ink, 206834 yellow dye ink, 206835 black dye ink, available from ENCAD, Inc., San Diego, Calif.). The resulting image exhibited high color density, excellent line sharpness with no bleed or feathering between colors, and waterfastness.

Examples 23(a) and 23(b)

These examples demonstrate ink receptive articles comprising STS particles and a cationic binder coated onto spunbond nonwoven substrate.

(a) Composition A using STS prepared according to Example 12 with the cationic latex binder of Example 21 was flood-coated onto a REEMAY 2033 spunbond polyester, then dried in an oven at 110° C. This material was then printed as in Example 14(a). The resulting image exhibited high color density, and excellent line sharpness with no bleed or feathering between colors, and waterfastness.

(b) The same materials as in Example 23(a) was printed as in Example 22(b). The resulting image exhibited high color density, excellent line sharpness with no bleed or feathering between colors, and waterfastness.

Example 24

These examples demonstrate ink receptive articles comprising a cationic binder coated onto PET film.

Composition A using STS prepared according to Example 13 with the cationic latex polymer binder of Example 21 was coated onto a PET substrate using a #60 Mayer rod (nominal wet thickness=0.137 mm), then dried in an oven at 110° C. This material was then printed as in Example 14(a). The resulting print exhibited high color density, excellent line sharpness with no bleed or feathering between colors, and waterfastness.

Examples 25–43 Demonstrate Syntheses of STS Particles

Example 25

This example describes the synthesis of aggregated transparent STS particles.

(a) In a 20 mL scintillation vial were combined 0.2 g $C_{16}TAB$, 7.30 g deionized water, 2.45 g methanol, and 0.049 mL concentrated ammonium hydroxide (29 percent aqueous) to form an alkaline micellar solution. To this mixture, with vigorous stirring, was added 0.625 mL TMOS. The mixture turned from clear and colorless to opalescent and white in 10–12 seconds. SEM revealed uniform spherical 75–100 nm aggregated particles. XRD indicated a diffraction peak at about 4.1 nm, indicative of uniform channels that had roughly this size.

(b) In a 20 mL scintillation vial were combined 0.2 g $C_{16}TAB$, 7.35 g deionized water, 2.45 g methanol, and 0.010 mL concentrated ammonium hydroxide (29 percent aqueous) to form an alkaline micellar solution. To this mixture was added 0.625 mL TMOS with vigorous stirring (1000 rpm). The mixture turned from clear and colorless to a slightly turbid in about 40 seconds. The solution continued to become more turbid with time. Over the course of about 24 hours, the solution formed a very weak translucent gel, which had a slightly grayish appearance. No precipitation or settling occurred. A SEM investigation showed that the primary particle size did not increase with time (15 minutes vs 2 hours). The increase in turbidity was ascribed to particle aggregation rather than particle growth. SEM also revealed uniform spherical 30–50 nm primary particles. XRD indicated a broad, weak diffraction peak at about 4.7 nm, which is indicative of uniform channels that had roughly this size.

Example 26

This example describes the synthesis of aggregated transparent STS particles using N-(trimethoxysilylpropyl) isothiouronium chloride (abbreviated hereinafter as TIP).

(a) In a 20 mL scintillation vial were combined 0.2 g $C_{16}TAB$, 7.20 g deionized water, 2.43 g methanol, and 0.010 mL concentrated ammonium hydroxide (29 percent aqueous) to form an alkaline micellar solution. To this mixture was added 0.625 mL TMOS with vigorous stirring (1000 rpm). About 1 minute after the TMOS was added (i.e., 20 seconds after gelation), 1.15 g TIP (50 percent in water) was added to the slightly turbid solution. The turbidity of the solution remained essentially constant for greater than 1 month, and the solution is assumed to be indefinitely stable. Particle size analysis performed 1 month after synthesis indicated a bimodal distribution with most of the particles tightly grouped between 40 and 75 nm. A smaller portion of the fraction of the solids had sizes between 420 and 750 nm.

(b) Solutions were prepared as in Example 25(a). TIP was added at various times in the synthesis. Turbidity was undetectable to the naked eye when TIP was added either before the TMOS or within 40 seconds after the TMOS. When added more than 40 seconds after the TMOS, turbidity of the solution was greater the longer one waited to add the TIP.

(c) Solutions were prepared as in Example 25(b). 1.00 mL, 0.10 mL, and 0.01 mL of TIP were added 1 minute after addition of TMOS. The turbidity of the solution that contained 1.00 mL remained the same for greater than 1 month. The turbidity of the other two slowly increased over the course of a few hours. The solution with only 0.01 mL TIP gelled within a few hours.

Example 27

This example demonstrates the effect of catalyst concentration on transparent STS particle pore size.

Samples were prepared as in Example 25(a), the following amounts of deionized water and concentrated ammonium hydroxide were used:

|  | Water (g) | Concentrated NH$_4$OH (g) |
| --- | --- | --- |
| Example 27(a) | 4.9 | 2.45 |
| Example 27(b) | 6.13 | 1.23 |
| Example 27(c) | 6.86 | 0.49 |
| Example 27(d) | 7.11 | 0.245 |
| Example 27(e) | 7.30 | 0.049 |
| Example 27(f) | 7.35 | 0.01 |

Examples 27(a) through 27(d) gelled to form a white opaque material within 3 seconds after the addition of TMOS; Example 27(e) formed a milky white solution, and Example 27(f) formed a slightly turbid solution. XRD revealed that Examples 27(a) through 27(d) provided at least three well defined Bragg peaks, with the primary peak at 3.1–3.3 nm, indicating a hexagonal lattice of 1-d tubes within each particle. Example 27(e) gave a less well defined pattern. Example 27(f) clearly showed a weak Bragg peak at about 4.7 nm, which indicated the channel sizes were larger in this material than in Examples 27(a) through 27(d).

Example 28

This example describes the synthesis of aggregated transparent STS particles using an acidic ethanol extraction.

In a 20 mL scintillation vial were combined 0.8 g C$_{16}$TAB, 6.90 g deionized water, 2.90 g methanol, and 0.040 mL concentrated anmonium hydroxide (29 percent aqueous) to form an alkaline micellar solution. To this mixture was added 0.625 mL TMOS with vigorous stirring (1000 rpm). About 2.5 minutes after the TMOS was added (i.e., 20 seconds after gelation), 1.15 g TIP (50 percent in water) was added to the slightly turbid solution. The solution gelled overnight. About 4 g of the gel was suspended in 127 mL absolute ethanol. To this was added 0.12 g concentrated hydrochloric acid to form a 0.01M acidic solution. The solution was stirred overnight; the following day, it was centrifuged at 1600 rpm for 10 minutes, decanted, refilled with about 127 mL ethanol, centrifuged at 1800 rpm for 10 minutes, and decanted again. The gelatinous mass at the bottom of the centrifuge tube was then added to 18 g of deionized water to form a 10 percent solids suspension. The suspension was stirred for 30 minutes at 1200 rpm and then sonicated 5 minutes to form a dispersion. After 20 days the suspension had settled, but not completely (i.e., the solution was still turbid, but had a layer of precipitate at the bottom). The settled material was easily re-suspended by sonication.

Example 29

This example describes the synthesis of aggregated transparent STS particles using tetramethylammonium hydroxide (hereinafter referred to as TMAOH).

In a 20 mL scintillation vial were combined 0.2 g C$_{16}$TAB, 7.40 g deionized water, methanol, and tetramethylammonium hydroxide as indicated in the following Table. The TMAOH was added as a 25 weight percent solution in methanol. To these mixtures was added 0.625 mL TMOS with vigorous stirring (1000 rpm). All samples were clear and transparent immediately after the addition of TMOS. Subsequently, Examples 29(a) and 29(b) turned opaque white within a few seconds; Example 29(c) turned milky white/opalescent after 15 seconds; Example 29(d) turned slightly turbid after 40 seconds. Final solution pH varied from 11.8 for 29(a) to about 5.5 for 29(d). In contrast to examples prepared with ammonium hydroxide at the same catalyst/silica weight ratio, Examples 29(c) and 29(d) did not aggregate (over the course of more than 1 week). Particle size analysis revealed a narrow distribution of particles between 75 and 130 nm. Particle size analysis revealed that the mean particle size of Example 29(d) was 97±27 nm.

|  | Methanol (g) | TMAOH (g) |
| --- | --- | --- |
| Example 29(a) | 2.45 | 1.97 |
| Example 29(b) | 2.45 | 0.56 |
| Example 29(c) | 2.45 | 0.11 |
| Example 29(d) | 2.45 | 0.022 |

Example 30

This example describes the synthesis of aggregated transparent STS particles using tetrabutylammonium hydroxide (hereinafter referred to as TBAOH).

In a 20 mL scintillation vial were combined 0.2 g C$_{16}$TAB, 7.40 g deionized water, and methanol TBAOH as described in the following Table. The TBAOH was added as a 25 weight percent solution in methanol. To these mixtures was added 0.625 mL TMOS with vigorous stirring (1200 rpm). All samples were clear and transparent immediately after the addition of TMOS. Subsequently, Example 30(a) turned opaque white after 17 seconds; Example 30(b) turned opaque white after 8 seconds; samples turned milky white/opalescent after 15 seconds; Example 30(c) turned slightly turbid after 35 seconds. Final solution pH varied from 10–11 for Examples 30(a) and 30(b) to about 6.1, for Example 30(d).

|  | Methanol (g) | TBAOH (g) |
| --- | --- | --- |
| Example 30(a) | 3.05 | 4.06 |
| Example 30(b) | 2.45 | 2.03 |
| Example 30(c) | 2.45 | 0.41 |
| Example 30(d) | 2.45 | 0.082 |

Example 31

This example describes the acid-catalyzed synthesis of aggregated transparent STS particles.

Examples were prepared with four different acidic catalysts: hydrochloric acid, acetic acid, sulfuric acid, and phosphoric acid. The general synthetic procedure was as follows:

In a 20 mL scintillation vial were combined 0.20 g C$_{16}$TAB, 4.60 g deionized water, 2.45 g methanol, and 2.3 mL acid (38 percent aqueous hydrochloric acid, glacial acetic acid, concentrated sulfuric, or 85 percent phosphoric acid). To the acidic micellar solution was added 0.625 mL TMOS with vigorous stirring (1200 rpm).

In the case of hydrochloric acid and sulfuric acid, a colloidal precipitate formed within 1–5 minutes. In the case of phosphoric acid, no reaction was detectable. In the case of acetic acid, a highly transmissive solution formed that was quite stable with time. The final pH was about 1.6. The solution containing acetic acid remained highly transmissive, with no signs of precipitates for greater than 1 month. XRD revealed a pattern similar to a cubic, bicontinuous liquid crystalline phase with primary peaks at 40, 3.57, 3.12 and 1.79 nm, in addition to 5 more peaks between 3.0 and 5.5° two-theta and an envelope between 7 and 10° two-theta on a diffractometer equipped with a Cu anode. Field emission SEM revealed mostly sub-50 nm particles with a few faceted hexagons (~85 nm on a side). TEM revealed ~20 nm particles containing regular 2–3 nm features (pores) within each particle.

Examples 32(a) through 32(d)

This example describes the effect of acetic acid concentration on solution stability of transparent STS particles.

Samples were prepared as in Example 31, except that acetic acid was added in the amounts in the following Table. Example 32(a) was cloudy prior to the addition of TMOS, but that after the TMOS was added, the solution was stable and very transmissive for greater than 1.5 months. Example 32(b) solution was very slightly turbid after addition of TMOS; after 1.5 months a weak gel formed, but the material was still highly transmissive. Examples 32(c) and 32(d) were totally transparent solutions for up to 3 hours; over the course of 1.5 months, the solutions gelled and formed translucent, but still transmissive gels.

|  | Acetic Acid (mL) |
| --- | --- |
| Example 32(a) | 4.6 |
| Example 32(b) | 2.3 |
| Example 32(c) | 0.46 |
| Example 32(d) | 0.23 |

Example 33

A colloidal suspension was prepared as in Example 31 with acetic acid, but with a scale factor of 10 times. The final molar weight ratios were 1.00 TMOS:0.13 $C_{16}$TAB:60.6 water:9.07 acetic acid:18.1 methanol.

Example 34

$C_{16}$TAB (2.0 g) was combined with DI water (46 mL), glacial acetic acid (23 mL), TEOS (8.6 mL), and ethanol (31 mL) in a polypropylene container. The mixture was shaken by hand for about 1 minute to form a colloidal suspension of STS particles. The final molar weight ratios were 1.00 TEOS:0.141 $C_{16}$TAB:66.2 water:10.5 acetic acid:19.7 ethanol.

Example 35

This example describes a preparation of STS particles.

$C_{16}$TAB (0.20 g) was combined with 2.45 g methanol, 3.81 g deionized water, and 3.5 mL concentrated hydrochloric acid in a 20-mL scintillation vial. To this clear solution was added 0.625 mL TMOS. Within 5 minutes, the solution turned from transparent to opaque gray. The sample was allowed to sit quiescent overnight. The following day, the materials was suction filtered and washed with ~300 mL of water and ethanol. The final molar weight ratio was 1.00 TMOS:0.13 $C_{16}$TAB:85 water:18 methanol:10.5 hydrochloric acid.

The dried particles were analyzed by SEM, which revealed 3–4 µm spheres.

Example 36

This example describes a preparation of STS particles from a more concentrated synthetic mixture.

$C_{16}$TAB (0.40 g) was combined with 2.80 mL methanol, 3.50 g deionized water, and 3.50 mL concentrated hydrochloric acid in a 20-mL scintillation vial. To this clear solution was added 1.25 mL TMOS. Within 3 minutes, the solution turned from transparent to opaque gray. The sample was allowed to sit quiescent overnight. The following day, the materials was suction filtered and washed with water and ethanol. The final molar weight ratio was 1.00 TMOS:0.13 $C_{16}$TAB:40 water:8.1 methanol:5.4 hydrochloric acid. This solution was approximately 7.9 weight percent silica plus surfactant.

The dried particles were analyzed with SEM, which revealed 2–5 µm spheres and ellipsoids.

Example 37

This example describes a preparation of STS particles using glycerol as the cosolvent.

$C_{16}$TAB (0.20 g) was combined with 3.10 mL glycerol, 3.80 g deionized water, and 3.50 mL concentrated hydrochloric acid in a 20-mL scintillation vial. To this clear solution was added 0.625 mL TMOS. Within a few seconds, the solution turned from transparent to opaque gray. The sample was allowed to sit quiescent overnight. The following day, the materials were suction filtered and washed with water and ethanol. The dried particles were analyzed with SEM, which revealed aggregated 0.5–2 µm particles. The final molar weight ratio was 1.00 TMOS:0.13 $C_{16}$TAB:85 water:18 methanol:10.5 hydrochloric acid.

The mean particle size was about 1 µm with a range of sizes from 0.5 to 2 µm. Particles were strongly aggregated and had ill-defined shapes.

Example 38

This example describes the preparation of STS particles using tetraethoxysilane as the silica source.

$C_{16}$TAB (0.2 g) was combined with 3.1 mL methanol, 3.80 g deionized water, 3.50 mL concentrated hydrochloric acid (38 weight percent aqueous) in a 20-mL scintillation vial. To this magnetically stirred (1000 rpm) solution was added rapidly 0.86 mL TEOS. Large colloids began to form within a few minutes, but the remainder of the solution was clear. After a few minutes, the solution turned opaque. The final molar weight ratio was 1.00 TEOS:0.13 $C_{16}$TAB:6.62 water:1.06 methanol:1.31 hydrochloric acid. This solution was approximately 27 weight percent silica plus surfactant.

The range of particle sizes was about 3 µm to 5 µm. Particles were ellipsoidal and many were intergrown to form doublets.

Example 39

This example describes the preparation of STS particles using a synthetic mixture highly concentrated in reagents.

$C_{16}$TAB (1.6 g) was combined with 1.14 mL methanol, 1.39 g deionized water, 3.50 mL concentrated hydrochloric acid (38 weight percent aqueous) in a 20-mL scintillation vial. To this magnetically stirred solution was added rapidly 5.00 mL TMOS. The solution turned opaque in about 15 seconds. The final molar weight ratio was 1.00 TMOS:0.142 $C_{16}$TAB:92.6 water:19.8 methanol:11.5 hydrochloric acid. Particle size ranged from <1 μm to about 2 μm.

Example 40

This example describes the preparation of STS particles using various glycerol/water molar weight ratios.

$C_{16}$TAB (0.2 g) was combined with 3.1 mL glycerol plus acetone (ratios given below), 3.80 g deionized water, 3.50 mL concentrated hydrochloric acid (38 weight percent aqueous), 2.7 mL concentrated ammonium hydroxide in a 20-mL scintillation vials. To these magnetically stirred solutions was added rapidly 0.86 mL TMOS.

|  | Glycerol (mL) | Acetone (mL) |
| --- | --- | --- |
| Example 40(a) | 3.10 | 0 |
| Example 40(b) | 2.95 | 0.15 |
| Example 40(c) | 2.80 | 0.30 |
| Example 40(d) | 2.65 | 0.45 |
| Example 40(e) | 2.50 | 0.60 |
| Example 40(f) | 2.35 | 0.75 |

Within 20 seconds all solutions turned opaque. The mean particle sizes of all preparations were about 1 μm; the range of particle sizes for each preparation was from about 0.5 μm to about 2 μm.

Example 41

This example describes the preparation of STS particles using a glycerol/acetone mixture as the cosolvent.

$C_{16}$TAB (20 g) was combined with 235 mL glycerol, 75 mL acetone, 381 mL deionized water, and 350 mL concentrated hydrochloric acid (38 weight percent aqueous) in a 4-L beaker and agitated with an overhead stirrer. To this was added rapidly 62.5 mL TMOS. Within one few minute the solution turned opaque. The final molar weight ratios were 1.00 TMOS:0.13 $C_{16}$TAB:85 water:18 methanol:10.5 hydrochloric acid. The mean particle size was approximately 1 μm with a range from 0.5 to 2 μm.

Example 42

This example describes the synthesis of templated silica particles using a block copolymer.

PLURONIC P123 (4 g), concentrated hydrochloric acid (37.5–39 weight percent, 23 g) and deionized water (105 g) were combined in a beaker. This mixture was heated to 35° C. and stirred until the surfactant completely dissolved. TEOS (8.54 g) was added to the solution and the solution immediately became turbid. After about 5 minutes, white particles were evident. Within 1 hour, a white and pasty sample was formed. After 18 hours the pH=0 sample was suction filtered. The final molar ratios were 1 TEOS:0.019 P123:5.85 HCl:163 $H_2O$.

Approximately one-half of the wet filtered sample was loaded into a 125 mL polypropylene bottle to be treated hydrothermally. Deionized water (100 mL) was added. The pH of the solution was 1.3. The sample was placed in an 80° C. oven overnight. The following day, the sample was suction filtered. The as-made and hydrothermally treated samples were calcined at 550° C. (the ramp rate was ~9°/min).

Scanning electron microscopy revealed that the uncalcined as-made and hydrothermally treated sample comprised faceted worm-like tubules typically 0.4 μm wide by ~1 μm long. Small angle X-ray scattering revealed that both the uncalcined and calcined hydrothermal samples contain diffraction peaks at ~11.0 nm. This indicated the sample was porous, with a pore-to-pore distance of ~11.0 nm. Thermogravimetric analysis on the uncalcined hydrothermal sample indicated a large organic content, with an overall weight loss of about 58 weight percent between 200–1000° C. (the samples contained about 2 percent water). The calcined hydrothermal sample contained about 2 weight percent physisorbed water (25° C.–200° C.) and only 3.7 percent volatiles overall (loss at 1000° C.).

Example 43

The process described above in Example 43 was used to prepare a sample 40 times larger than above. The sample was treated hydrothermally (with no prior filtration) at 80° C. for 30 hours. The sample was suction filtered, dried in air overnight, and then dried at 100° C. for 24 hours. The sample was calcined as above.

Example 44

The procedure described in Example 42 was used to prepare samples with PLURONIC F77, P85, F98, P103, and P104 surfactants. All of the calcined samples exhibited one X-ray diffraction peak with a d spacing between 6.5 and 8.5 nm, indicating periodic porous materials. The sample made using PLURONIC F77 surfactant had smooth 1–5 μm spheres and ellipsoids that had very little necking. The sample made using PLURONIC P85 surfactant provided particles ranging from irregularly shaped aggregated chunks of less than 1 μm to rough particles of 6 μm in size. The above particles have surface textures on the scale of about 50–150 nm. The sample made using PLURONIC F98 surfactant provided smooth pieces of 100–200 μm in size. These pieces have a surface texture on a scale of less than 100 nm. The samples made using PLURONIC P103 surfactant provided smooth, bent, worm-like particles about 1–2 μm long by about 0.5 μm wide. The sample made using PLURONIC P104 surfactant provided a significant fraction of particles similar to those made using PLURONIC P 103 surfactant as well as fused and faceted particles. The sample made using PLURONIC P123 surfactant provided faceted, unbent tubules or about 1–1.5 μm long and about 0.2–0.3 μm wide.

Example 45

This example describes the preparation of large pore STS by templating with ethoxylated fatty amines.

ETHOMEEN 18/25 (1 g) was combined with deionized water (26 g), concentrated hydrochloric acid (5.75 g), and tetraethoxysilane (2.1 g). The mixture was allowed to react at about 35° C. for 20 hours after which time it was placed in an 80° C. oven for 4 hours and then removed. The samples were suction filtered, dried at room temperature, and calcined at 550° C. The same procedure was carried out concurrently but with 1 g ETHOMEEN. X-ray diffraction revealed 1 Bragg peak at ~3.5 nm for the ETHOMEEN 18/25 sample and one peak at ~4.0 nm for the ETHOMEEN 18/60 sample.

Example 46

Both preparations in Example 45 were scaled using ten times the reagents. X-ray diffraction indicated one Bragg peak at 3.9 nm for the ETHOMEEN 18/25 sample and one peak at ~4.1 nm for the ETHOMEEN 18/60 sample.

Example 47

This example describes the preparation of transparent STS nanoparticles with expanded pore sizes.

$C_{16}TAB$ (0.20 g), deionized water (4.6 g), glacial acetic acid (2.3 mL), toluene (0.68 mL), and TMOS (0.63 mL) were combined in a 20 mL scintillation vial. A transparent sol of STS nanoparticle resulted. The sol was aged for 4 days. X-ray diffraction indicated Bragg peaks at 4.1 and 3.7 nm, which is consistent with a cubic mesophase that has been swollen by toluene. A second sample was prepared identically to the first except that 0.25 mL toluene was used. X-ray diffraction results were identical to those with 0.68 mL toluene.

Example 48

This example describes the preparation of surfactant-templated alumina.

In a glass container, 30 g of aluminum butoxide was dissolved in 125 g of isopropanol with magnetic stirring. In a separate glass container, 4 g of PLURONIC P123 was dissolved in 5 g of isopropanol. The latter solution was added to the former with stirring. The mixture was stirred for about 10 minutes, after which time 1 g of deionized water was added. Gelation occurred about 5 minutes after the water was added. The gel was broken down with further addition of 125 g of isopropanol. This solution was divided into two portions. One portion was reacted at room temperature and the other was placed in a 35° C. oven to react. Both were allowed to react for twenty hours. The samples were than suction filtered through filter paper, dried at room temperature for about 2 hours and then calcined at 550° C. for 6 hours. X-ray diffraction revealed one Bragg peak at 14.0 nm for the sample reacted at room temperature and at 13.5 nm for the sample reacted at 35° C.

What is claimed is:

1. An ink receptor medium comprising:
   a) a substrate; and
   b) an ink receptor on the substrate, the ink receptor comprising a mixture of
      i) surfactant templated mesoporous particles, and
      ii) organic binder.

2. The ink receptor medium according to claim 1 further comprising an ink fixing agent in contact with the ink receptor.

3. The ink receptor medium according to claim 1 wherein the surfactant templated mesoporous particles are comprised of silica, silica-metal oxide, metal oxides, or combinations thereof.

4. The ink receptor medium according to claim 1 wherein the surfactant templated mesoporous particles have a mean particle size of 100 µm or less.

5. The ink receptor medium according to claim 1 wherein the ink receptor is transparent.

6. The ink receptor medium according to claim 1 wherein the surfactant templated mesoporous particles have an intraparticle pore size of greater than 1.5 nm.

7. The ink receptor medium according to claim 1 wherein the organic binder has a glass transition temperature of between −125° C. to 125° C.

8. The ink receptor medium according to claim 1 wherein the organic binder is water insoluble.

9. The ink receptor medium according to claim 1 wherein the organic binder is a cationic polymeric latex containing up to 10 mole percent of a monomer possessing cationic or quaternary ammonium functionality.

10. The ink receptor medium according to claim 9 wherein said polymeric latex is formed from at least one monomer selected from the group consisting of vinyl monomers, urethane monomers, and acrylate monomers.

11. The ink receptor medium according to claim 1 wherein the organic binder is water soluble.

12. The ink receptor medium according to claim 1 wherein the surfactant templated mesoporous particle to organic binder ratio is in the range of 1:40 to 40:1 by weight.

13. The ink receptor medium according to claim 1 wherein the ink receptor is applied over a portion of the substrate.

14. An ink receptor composition comprising a mixture of:
   a) surfactant templated mesoporous particles; and
   b) organic binder.

15. The ink receptor composition according to claim 14 wherein the surfactant templated mesoporous particles have a mean particle size of 100 µm or less.

16. The ink receptor composition according to claim 15 wherein the surfactant templated mesoporous particle to organic binder ratio is in the range of 1:40 to 40:1 by weight.

17. The ink receptor composition according to claim 14 wherein the ink receptor composition is transparent.

18. The ink receptor composition of claim 14 wherein the surfactant templated mesoporous particles are comprised of silica, silica-metal oxide, metal oxides, or combinations thereof.

19. The ink receptor composition according to claim 14 wherein the surfactant templated mesoporous particles have an intraparticle pore size of greater than 1.5 nm.

20. The ink receptor composition according to claim 14 wherein the organic binder has a glass transition temperature of between −125° C. to 125° C.

21. The ink receptor composition according to claim 14 wherein the organic binder is water insoluble.

22. The ink receptor composition according to claim 14 wherein the organic binder is water soluble.

23. A method of printing comprising the step of contacting ink with an ink receptor medium comprising:
   a) a substrate; and
   b) an ink receptor on the substrate, the receptor comprising a mixture of:
      i) surfactant templated mesoporous particles, and
      ii) organic binder.

24. A composition of matter comprising surfactant templated silica particles having a mean particle size of from about 0.01 µm to about 100 µm, wherein 90 percent of the particles have a particle size of less than about 4 µm, and a pore size of about 1.5 nm to about 30 nm.

25. The composition of matter according to claim 24 wherein the particles have a $Q^3/Q^4$ ratio of greater than 0.5 as measured by $^{29}Si$ NMR.

26. The composition of matter according to claim 25 wherein the surfaces of the particles further have anions of an organic acid associated therewith.

27. The composition of matter according to claim 26 wherein 90 percent of the particles have a particle size of the particles is less than 2 µm.

28. A method of making surfactant templated silica comprising the steps of:
   a) forming a mixture comprising water, a silica source, an organic templating agent, and an organic acid catalyst selected from acetic acid, malonic acid, oxalic acid, lactic acid, citric acid, tartaric acid, or a combination thereof; and b) aging the solution for a sufficient time to form said silica particles.

29. The method according to claim 28 wherein the silica source is one or more alkoxysilanes.

30. The method according to claim 28 wherein the organic templating agent is a surfactant selected from the group consisting of cationic, anionic, nonionic, and combinations thereof.

31. The method according to claim 28 wherein the mixture further comprises a cosolvent.

32. A colloidal dispersion comprising surfactant templated mesoporous particles having a mean particle size of about 500 nm or less and pore sizes of about 1.5 to about 30 nm dispersed within a solvent wherein said dispersion is stable.

33. The dispersion according to claim 32 wherein the dispersion is transparent.

34. The colloidal dispersion according to claim 32 wherein the particles are functionalized with a silane coupling agent.

35. The colloidal dispersion according to claim 32 wherein the particles have a mean particle size of 150 nm or less.

36. The colloidal dispersion according to claim 32 wherein the particles have a mean particle size of 100 nm or less.

37. The colloidal dispersion according to claim 32 wherein the particles have a mean particle size of about 10 to about 50 nm.

38. The colloidal dispersion according to claim 32 wherein the surfactant templated mesoporous particles are selected from the group consisting of surfactant templated silica particles, surfactant templated silica-metal oxide particles, non-silica surfactant templated metal oxide particles, and combinations thereof.

39. A method of making surfactant templated silica particles comprising the steps of:
   a) forming a mixture comprising water, a silica source, an organic templating agent comprising an ethoxylated fatty amine, and an acid catalyst; and
   b) aging the solution for a sufficient time to form said silica particles.

\* \* \* \* \*